US010362297B2

(12) United States Patent
Takizawa et al.

(10) Patent No.: US 10,362,297 B2
(45) Date of Patent: Jul. 23, 2019

(54) IMAGE GENERATION APPARATUS, IMAGE GENERATION METHOD, AND CALIBRATION METHOD

(71) Applicant: SONY INTERACTIVE ENTERTAINMENT INC., Tokyo (JP)

(72) Inventors: Atsushi Takizawa, Saitama (JP); Nobuo Sasaki, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 40 days.

(21) Appl. No.: 15/519,295

(22) PCT Filed: Aug. 26, 2015

(86) PCT No.: PCT/JP2015/074010
§ 371 (c)(1),
(2) Date: Apr. 14, 2017

(87) PCT Pub. No.: WO2016/067729
PCT Pub. Date: May 6, 2016

(65) Prior Publication Data
US 2017/0230644 A1 Aug. 10, 2017

(30) Foreign Application Priority Data

Oct. 31, 2014 (JP) ................................. 2014-222569

(51) Int. Cl.
*H04N 13/111* (2018.01)
*H04N 13/327* (2018.01)
(Continued)

(52) U.S. Cl.
CPC ............. *H04N 13/327* (2018.05); *G06T 7/70* (2017.01); *H04N 13/111* (2018.05);
(Continued)

(58) Field of Classification Search
CPC .. H04N 13/327; H04N 13/366; H04N 13/111; H04N 13/302; G06T 2207/30208; G06T 7/70
(Continued)

(56) References Cited

U.S. PATENT DOCUMENTS

| 5,986,804 A * | 11/1999 | Mashitani .......... G02B 27/2207 359/462 |
| 2011/0032330 A1* | 2/2011 | Kim ........................ G09G 3/003 348/43 |
| 2012/0050154 A1* | 3/2012 | Jagmag ................... G06F 3/011 345/156 |

(Continued)

FOREIGN PATENT DOCUMENTS

| JP | 06-028452 A | 2/1994 |
| JP | 2000-315259 A | 11/2000 |

(Continued)

OTHER PUBLICATIONS

Simon et al, Multi-viewpoint images for multi-user interaction (Year: 2005).*

(Continued)

*Primary Examiner* — Shan E Elahi
(74) *Attorney, Agent, or Firm* — Katten Muchin Rosenman LLP

(57) ABSTRACT

A marker detection block 20 scans a taken image of a plurality of markers of a fixture worn on the head of a user so as to detect a two-dimensional coordinate on the taken image of the plurality of markers. A viewpoint position correction block 30 corrects a viewpoint position of the user without use of a coordinate in a Z direction of the markers but by use of the detected two-dimensional coordinate of the plurality of markers. A stereoscopic image generation block 40 generates a parallax image obtained when a three-dimensional object is viewed from the corrected viewpoint position.

6 Claims, 21 Drawing Sheets

(51) Int. Cl.
  *G06T 7/70*     (2017.01)
  *H04N 13/302*   (2018.01)
  *H04N 13/366*   (2018.01)
  *H04N 13/117*   (2018.01)

(52) U.S. Cl.
  CPC ......... *H04N 13/117* (2018.05); *H04N 13/302* (2018.05); *H04N 13/366* (2018.05); *G06T 2207/30208* (2013.01)

(58) Field of Classification Search
  USPC ......................................................... 348/51
  See application file for complete search history.

(56) References Cited

U.S. PATENT DOCUMENTS

| 2012/0287125 A1* | 11/2012 | Liu | G02B 27/2221 |
| | | | 345/419 |
| 2014/0184588 A1* | 7/2014 | Cheng | G06F 3/013 |
| | | | 345/419 |

FOREIGN PATENT DOCUMENTS

| JP | 2002-300610 A | 10/2002 |
| JP | 2007-102343 A | 4/2007 |
| JP | 2007-232753 A | 9/2007 |
| JP | 2009-267827 A | 11/2009 |
| JP | 2012-141502 A | 7/2012 |
| JP | 2012-223363 A | 11/2012 |
| JP | 2013-120150 A | 6/2013 |
| JP | 2014-45474 A | 3/2014 |

OTHER PUBLICATIONS

International Search Report and Written Opinion dated Nov. 24, 2015, from the corresponding PCT/JP2015/074010.

Notification of Reasons for Refusal dated Sep. 25, 2018, from Japanese Patent Application No. 2014-222569.

Notification of Reasons for Refusal dated Mar. 5, 2019, from Japanese Patent Application No. 2014-222569.

* cited by examiner

FIG. 2
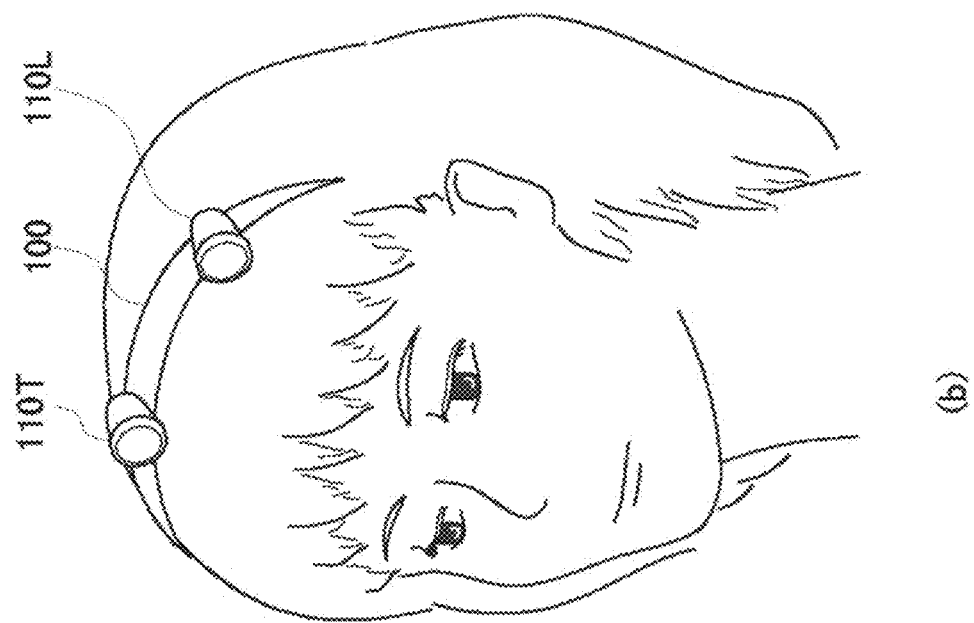
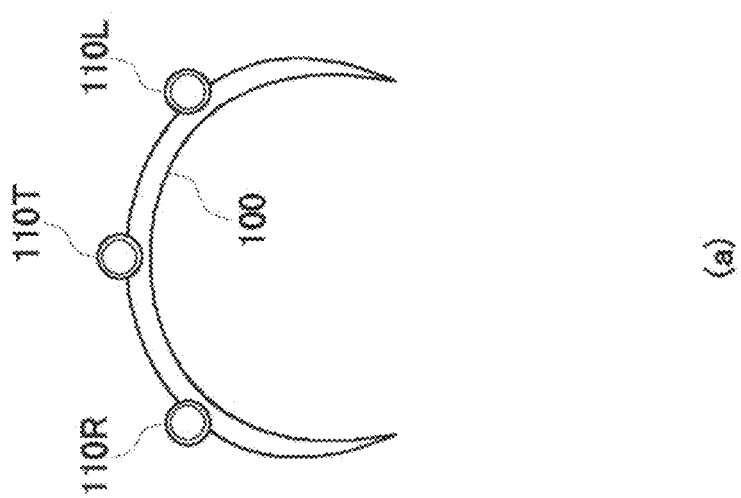

FIG.5
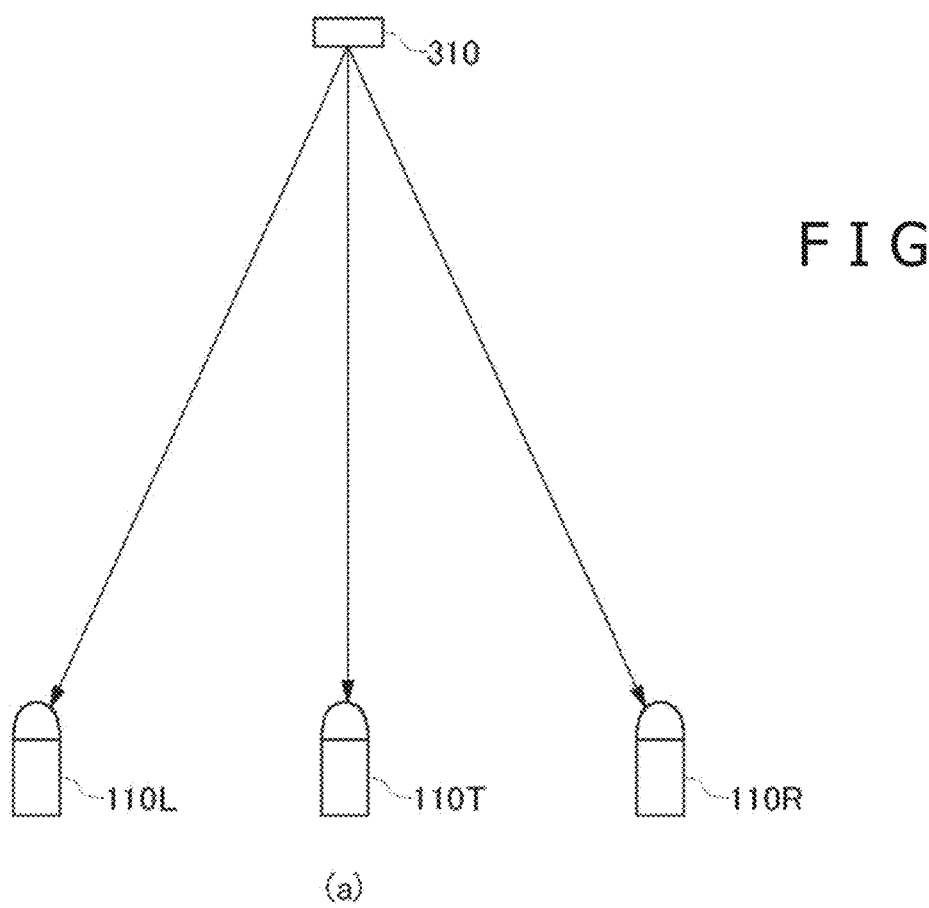
(a)
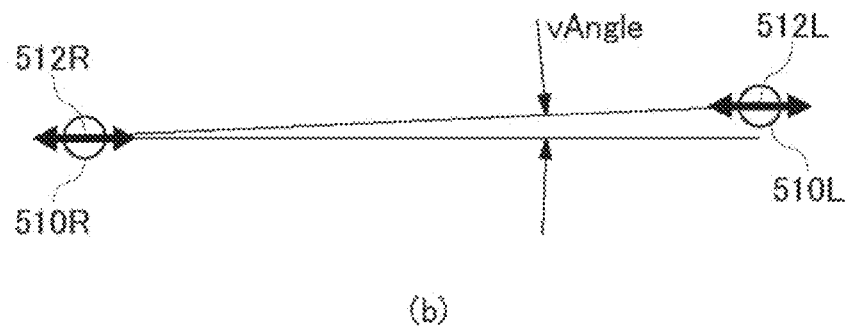
(b)

FIG.9
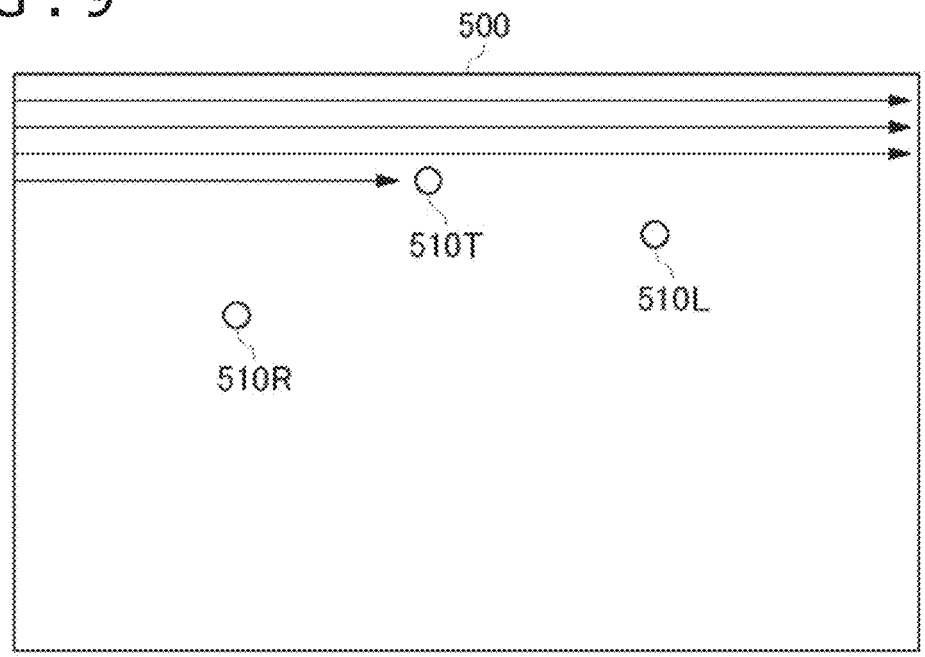
(a)
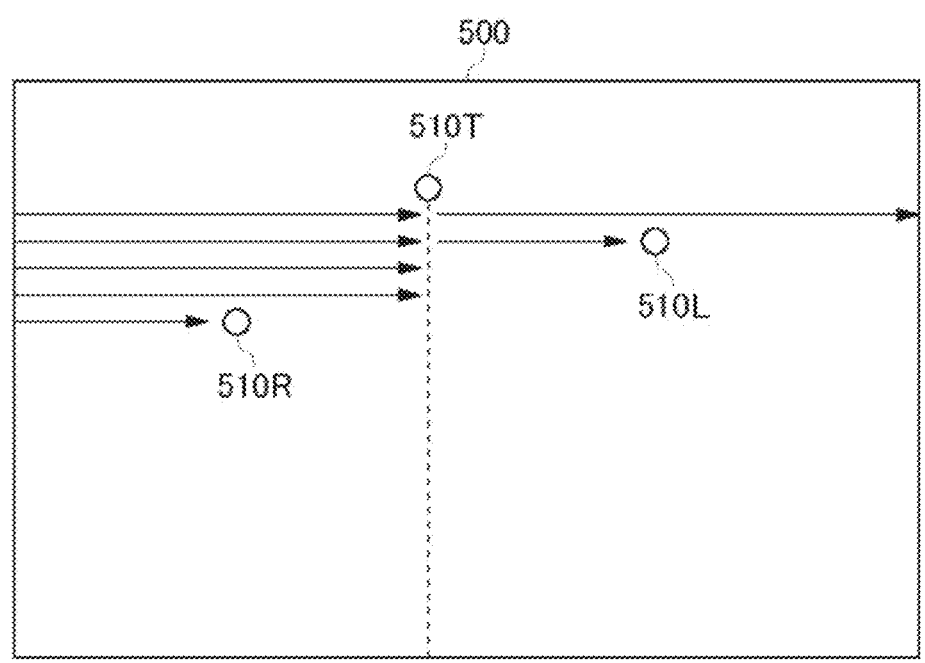
(b)

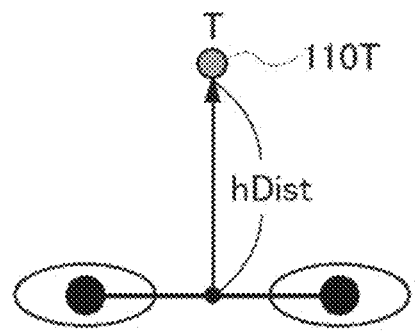
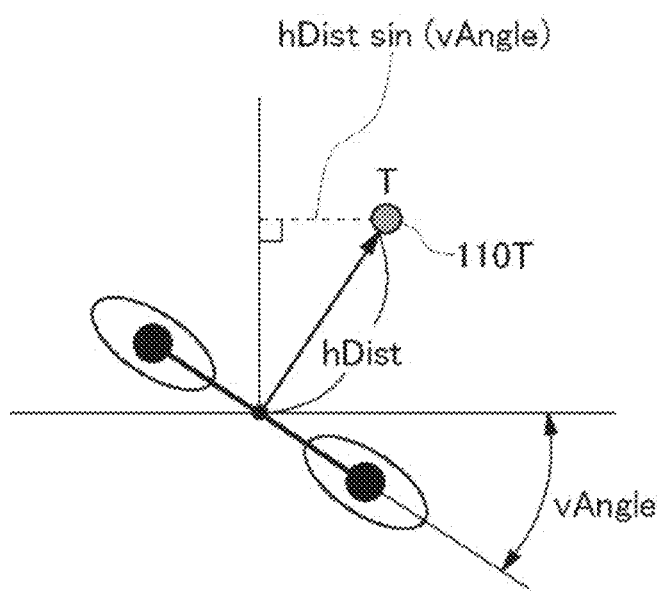
FIG.12

FIG.13
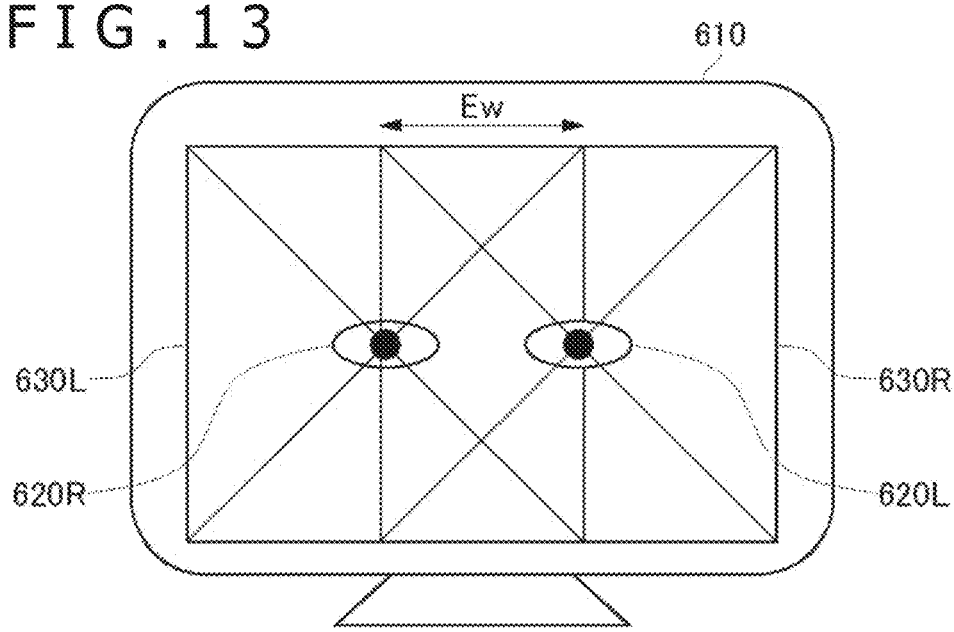
(a)
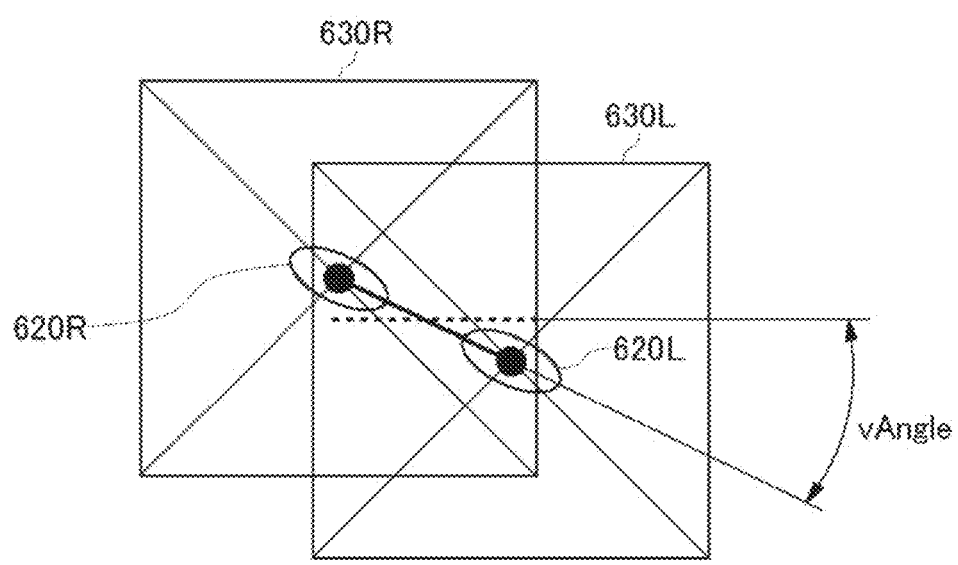
(b)

FIG.15
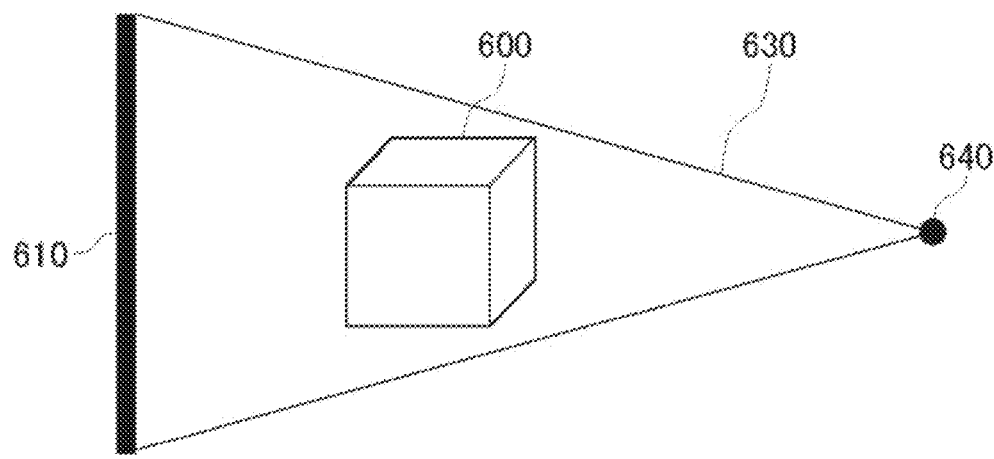
(a)
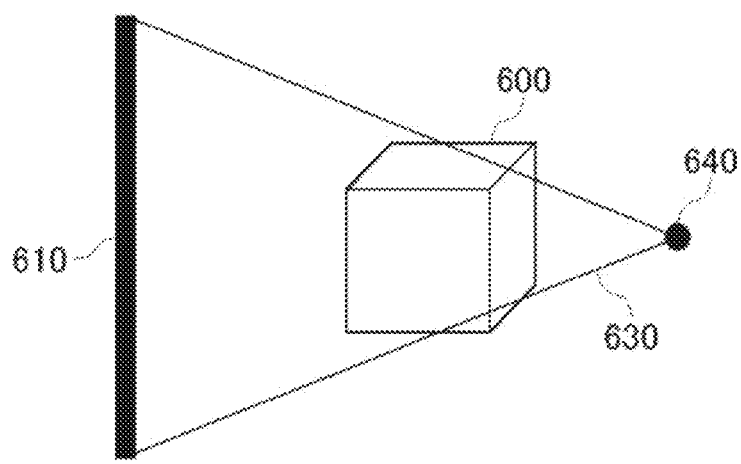
(b)

IMAGE GENERATION APPARATUS, IMAGE GENERATION METHOD, AND CALIBRATION METHOD

TECHNICAL FIELD

The present invention is related with an image generation apparatus, an image generation method, and a calibration method that are configured to generate stereoscopic videos.

BACKGROUND ART

Three-dimensional display devices such as three-dimensional television receivers and head-mounted displays that are configured to present videos in a stereoscopic manner are in use. Devices capable of stereoscopically presenting videos on portable terminals such as mobile phones and potable game machines have also been developed, thereby increasing the chances for general users to view stereoscopic videos.

A three-dimensional display device for displaying a stereoscopic video realizes stereoscopy of an image by a user by having the user view images having a parallax to the left and right eyes. There are available a method of using special optical glasses for presenting images having a parallax to the left and right eyes and a method of using a parallax barrier or a lenticular lens instead of optical glasses.

SUMMARY

Technical Problem

With the stereoscopy based on the three-dimensional display devices described above, it is assumed that information about a viewpoint position of a user can be correctly obtained and the viewpoint position is fixed without movement. However, it is not realistic to ask the user not to move his or her head at all. When a user is stereoscopically viewing a parallax image generated on the assumption that the viewpoint position does not move and, if the user moves or tilts his or her head only slightly, then the viewpoint position is displaced, thereby swinging a stereoscopic video being viewed, resulting in the difficulty in viewing or dizziness.

Therefore, the present invention addresses the above-identified and other problems associated with related-art methods and apparatuses and solves the addressed problems by providing an image generation apparatus, an image generation method, and a calibration method that are capable of generating stereoscopic videos stabilized even if viewpoints are displaced.

Solution to Problem

In order to solve the above problem, an image generation apparatus according to an aspect of the present invention includes: a marker detection block configured to scan a taken image of a plurality of markers of a fixture worn on a head of a user so as to detect a two-dimensional coordinate on the taken image of the plurality of markers; a viewpoint position correction block configured to correct a viewpoint position of the user without use of a coordinate of a Z direction of the markers but by use of the detected two-dimensional coordinate of the plurality of markers; and a stereoscopic image generation block configured to generate a parallax image obtained when a three-dimensional object is viewed from the corrected viewpoint position.

Another aspect of the present invention is a calibration method. The calibration method includes: a marker detecting step of scanning a taken image of a plurality of markers of a fixture worn on a head of a user so as to detect a two-dimensional coordinate on the taken image of the plurality of markers; a viewpoint position correcting step of correcting a viewpoint position of the user without use of a coordinate of a Z direction of the markers but by use of the detected two-dimensional coordinate of the plurality of markers; a stereoscopic image generating step of generating a parallax image obtained when a three-dimensional object for calibration is viewed from the corrected viewpoint position; and a calibrating step of prompting the user to adjust the positions of the markers by moving the fixture worn on the head of the user forward and backward so as to make the stereoscopically viewed three-dimensional object for calibration be at a standstill even if the head is moved.

A further aspect of the present invention is an image generation method. The image generation method includes: a marker detecting step of scanning a taken image of a plurality of markers of a fixture worn on a head of a user so as to detect a two-dimensional coordinate on the taken image of the plurality of markers; a viewpoint position correcting step of correcting a viewpoint position of the user without use of a coordinate of a Z direction of the markers but by use of the detected two-dimensional coordinate of the plurality of markers; and a stereoscopic image generating step of generating a parallax image obtained when a three-dimensional object is viewed from the corrected viewpoint position.

It is to be noted that anything converted an arbitrary combination of the above composition elements and expressions of the present invention between the method, apparatus, system, computer program, data structure and recording medium is also effective as an aspect of the present invention.

Advantageous Effect of Invention

According to the present invention, the stabilized stereoscopic videos can be displayed even if the viewpoints are displaced.

BRIEF DESCRIPTION OF DRAWINGS

FIGS. 2(a) and 2(b) are diagrams illustrating a headband-with-markers that are worn by a user.

FIG. 5(a) is a diagram illustrating a positional relation between the three markers of the headband and the camera, and FIG. 5(b) is a diagram illustrating an image of the left-side head marker and an image of the right-side head marker that are taken by the camera.

FIGS. 9(a) and 9(b) are diagrams illustrating methods of detecting the head-top marker, the left-side head marker, and the right-side head marker by scanning a taken image through a marker detection block.

FIGS. 12(a) and 12(b) are diagrams illustrating the positional change of the head-top marker due to the head tilt angles.

FIGS. 13(a) and 13(b) are diagram illustrating the displacement of the centers of the view frustums when the user tilts his or her head.

FIGS. 15(a) and 15(b) are diagrams illustrating advantages that can be obtained by not executing the corrections in the Z-direction of the viewpoint position.

DESCRIPTION OF EMBODIMENT

Figure 1:
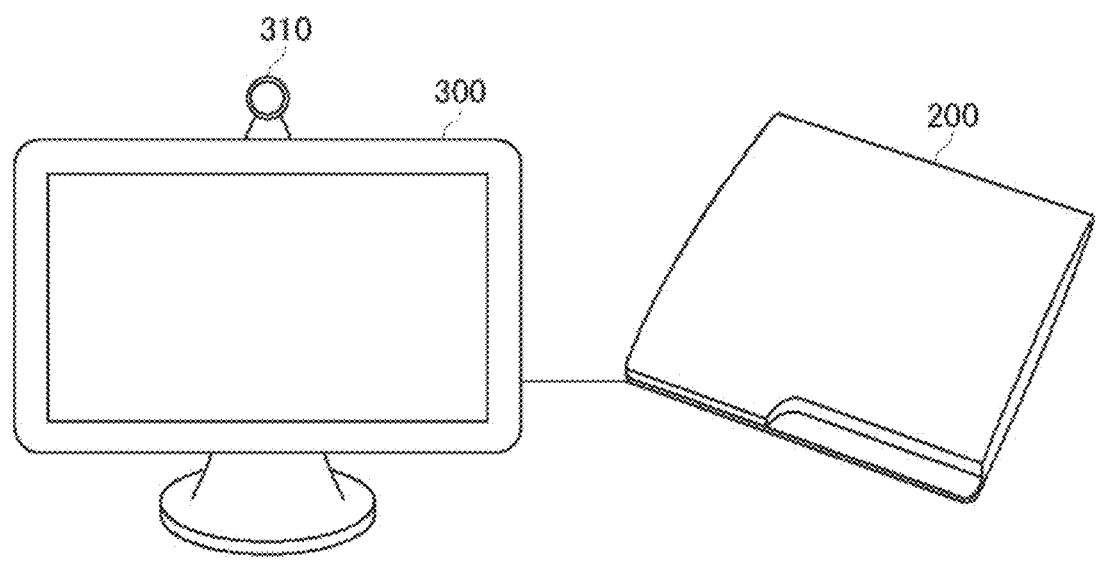
FIG. 1 is a diagram illustrating a three-dimensional display apparatus.

Now, referring to FIG. 1, there is depicted a diagram illustrating a three-dimensional display apparatus. The three-dimensional display apparatus has a game machine 200, a display 300, and a camera 310.

The display 300 is connected to the game machine 200 through an interface that connects peripheral devices in a wireless manner or through a universal serial bus (USB) port. The game machine 200 may further be connected to a server via a network. The display 300 may be connected to a computer or a portable terminal rather than the game machine 200. The camera 310, mounted on the top of the display 300, for example, takes an image of a user viewing the display 300 and supplies the taken image to the game machine 200.

FIGS. 2(a) and 2(b) are diagrams for describing a headband 100 with markers that is worn by the user.

FIG. 2(a) is a configuration diagram of the headband-with-markers 100. The headband 100 has a head-top marker 110T, a left-side head marker 110L, and a right-side head marker 110R. When the user wears the headband 100, the head-top marker 110T is positioned on the top of the user's head, the left-side head marker 110L is positioned on the left side of the user's head, and the right-side head marker 110R is positioned on the right side of the user's head. FIG. 2(b) illustrates an appearance in which the user wears the-headband-with-marker 100. These markers are made of infrared light emitting diodes, for example.

Herein, the headband is mounted with markers; however, anything that can be worn on the user's head and adjustable in a wearing position back and forth is available as a head fixture in addition to a headband. For example, the headband may be a headset or a cap.

Figure 3:
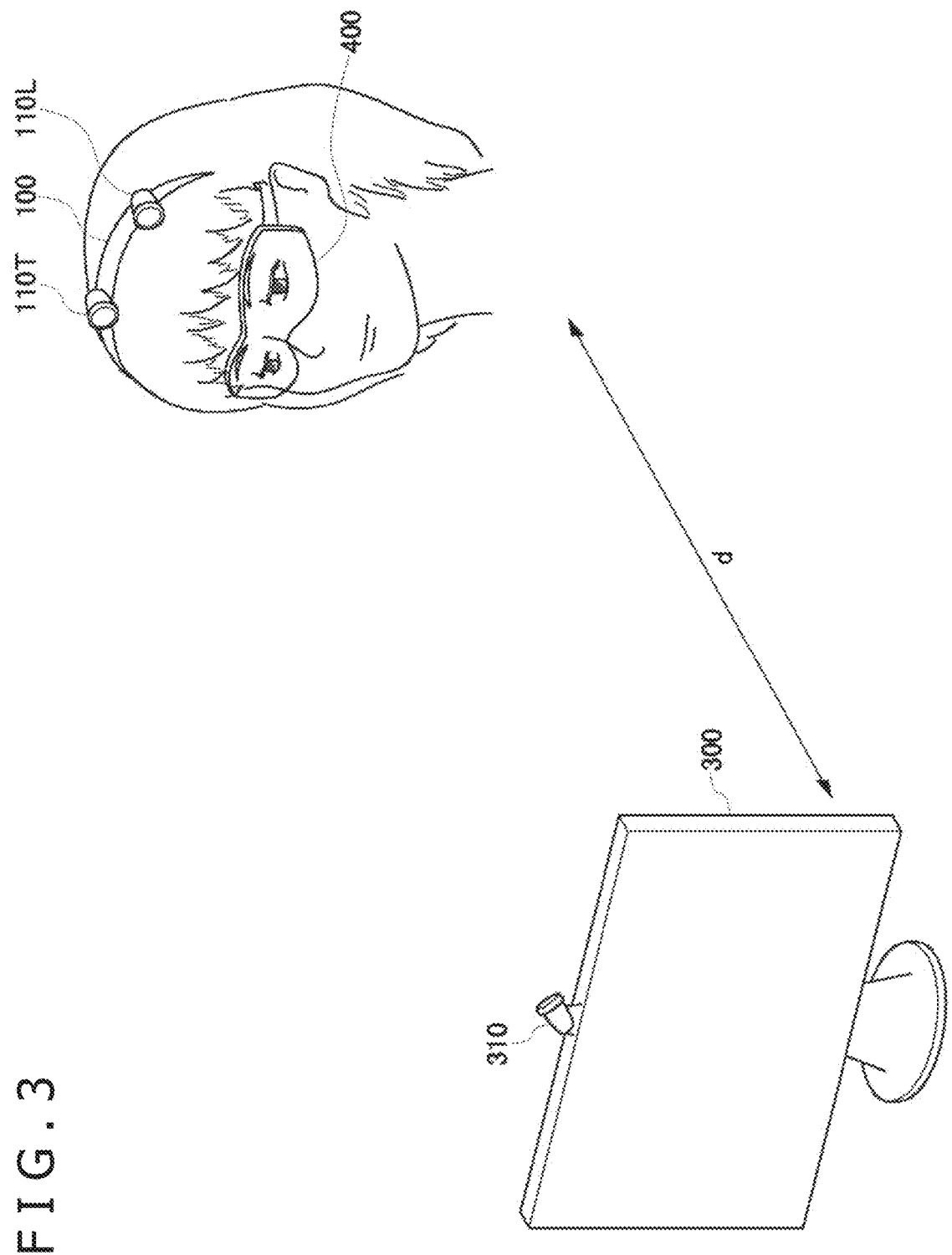
FIG. 3 is a diagram illustrating a manner in which the user wearing the headband-with-markers is viewing a display.

Referring to FIG. 3, there is depicted a diagram illustrating a manner in which a user wearing the headband-with-markers 100 is viewing the display 300.

The user is observing the display 300 at a place away from the display 300 by a distance d. In this example, the user wears a pair of stereoscopic vision glasses 400 and is viewing a screen of the display 300 on which a parallax image is displayed. The camera 310 mounted on the top of the display 300 takes an image of the head of the user who wears the headband-with-markers 100.

The camera 310 has an infrared light transmission filter and is capable of detecting the positions of the head-top marker 110T, the left-side head marker 110L, and right-side head marker 110R of the headband 100 through the image processing for detecting bright spots from an image of the user's head taken by the camera 310.

Figure 4:
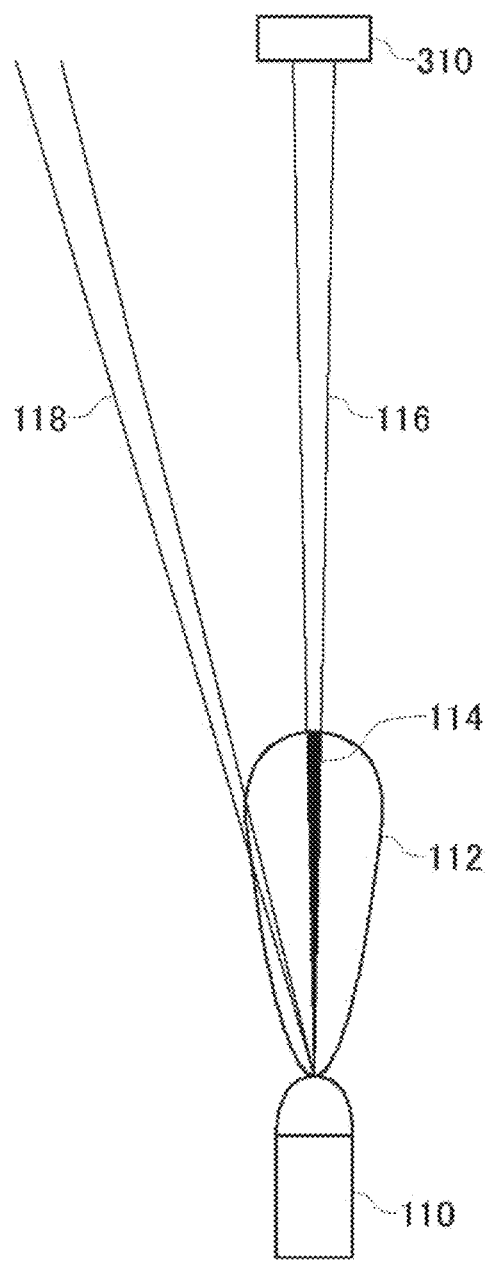
FIG. 4 is a diagram illustrating a manner in which a camera detects an emission distribution of one of the markers.

Referring to FIG. 4, there is depicted a diagram illustrating a manner in which the camera 310 detects an emission distribution of the marker 110. In order to minimize the power dissipation of the marker 110, a light emitting diode having directionality in the emission distribution is used; however, the accuracy in the positional detection at the time of detecting the position of the marker 110 by taking an image of the light of the marker 110 through the camera 310 depends upon the emission distribution.

The emission intensity distribution of the infrared light emitting diode expands in the front direction as depicted by a sign 112; when viewed from the front of the light emitting diode, the emission distribution is almost symmetrical and having little abrupt change, while viewed from a diagonal direction, a light intensity distribution that is not uniform is observed.

If the camera 310 takes a light 116 traveling from the front of the light emitting diode, then the gravity of a black area indicated by a sign 114 is detected as the position of the marker 110, thereby resulting in the highly accurate detection of the position of the marker 110. On the other hand, if the camera 310 takes a light 118 in a diagonal direction of the light emitting diode, then the amount of light is extremely reduced and becomes non-uniform depending on the angle, causing abrupt decrease of the measuring accuracy of the center of gravity, resulting in the difficulty in the correction detection of the position of the marker 110.

FIG. 5(a) is a diagram illustrating positional relations between the three markers 110T, 110L, and 110R of the headband 100 and the camera 310. The head-top marker 110T is positioned as opposed to the camera 310, so that the camera 310 is capable of taking an image of the head-top marker 110T and measuring the two-dimensional coordinates of the head-top marker 110T with a high accuracy. By contrast, the left-side head marker 110L and the right-side head marker 110R are positioned diagonally relative to the camera 310, so that the measuring accuracy of the two-dimensional coordinates is decreased.

FIG. 5(b) is a diagram illustrating an image 510L of the left-side head marker 110L and an image 510R of the right-side head marker 110R that are taken by the camera 310. The two-dimensional coordinate of the image 510L of the right-side head marker 110L has a measurement error 512L and the two-dimensional coordinate of the image 510R of the right-side head marker 110R has a measurement error 512R, resulting in a low measuring accuracy. However, if it is assumed that the user views the display when the user is in an upright state, then in the detection of the tilt of the head, the errors in the horizontal direction do not present a problem because these measurement errors 512L and 512R are in the horizontal direction, thereby minimizing the influence of the errors when measuring a head tilt angle vAngle.

In the present embodiment, the correction amount of a viewpoint position is determined with reference to the two-dimensional coordinate of the head-top marker 110T. In order to properly correct a viewpoint position, the user moves the position of the headband 100 forward or backward, thereby adjusting the position of the head-top marker 110T. This can minimize the difference between persons, thereby realizing the correction processing for correcting a viewpoint position in stereoscopic display with very small amount of computation.

Further, a head tilt is detected from the two-dimensional coordinates of the left-side head marker 110L and the right-side head marker 110R so as to execute additional stereoscopic display correction.

The coordinates in the Z direction of the head-top marker 110T, the left-side head marker 110L, and the right-side head marker 110R are not used. From the head-top marker 110T, only a position of the two-dimensional coordinate, namely, an XY plane of the head is taken and, from the left-side head marker 110L and the right-side head marker 110R, only a head tilt angle is taken for use in correction computation, thereby realizing the stable correction processing not much influenced by measurement errors for correcting a viewpoint position.

It should be noted that mounting the left-side head marker 110L and the right-side head marker 110R on the headband 100 with angles such that these markers are directed to the front of the camera 310 can enhance the measuring accuracy in the horizontal direction in the two-dimensional coordinates for both the left-side head marker 110L and the right-side head marker 110R; however, this arrangement is effective only for the case where the distance from the camera 310 to the headband 100 is constant, so that this is not a much realistic solution method. In the present embodiment, it is assumed that the measurement accuracy in the horizontal direction in the two-dimensional coordinates of the left-side head marker 110L and the right-side head marker 110R be low and, in order not to be affected by measurement errors, the detected two-dimensional coordinates are not directed used with the left-side head marker 110L and the right-side head marker 110R, thereby obtaining an angle between the line interconnecting the left-side head marker 110L and the right-side head marker 110R and the horizontal direction (namely, the user's head tilt angle vAngle). In the process of obtaining the tilt angle, the measurement error of the two-dimensional coordinate of the left-side head marker 110L and the measurement error of the two-dimensional coordinate of the right-side head marker 110R can be offset.

Figure 6:
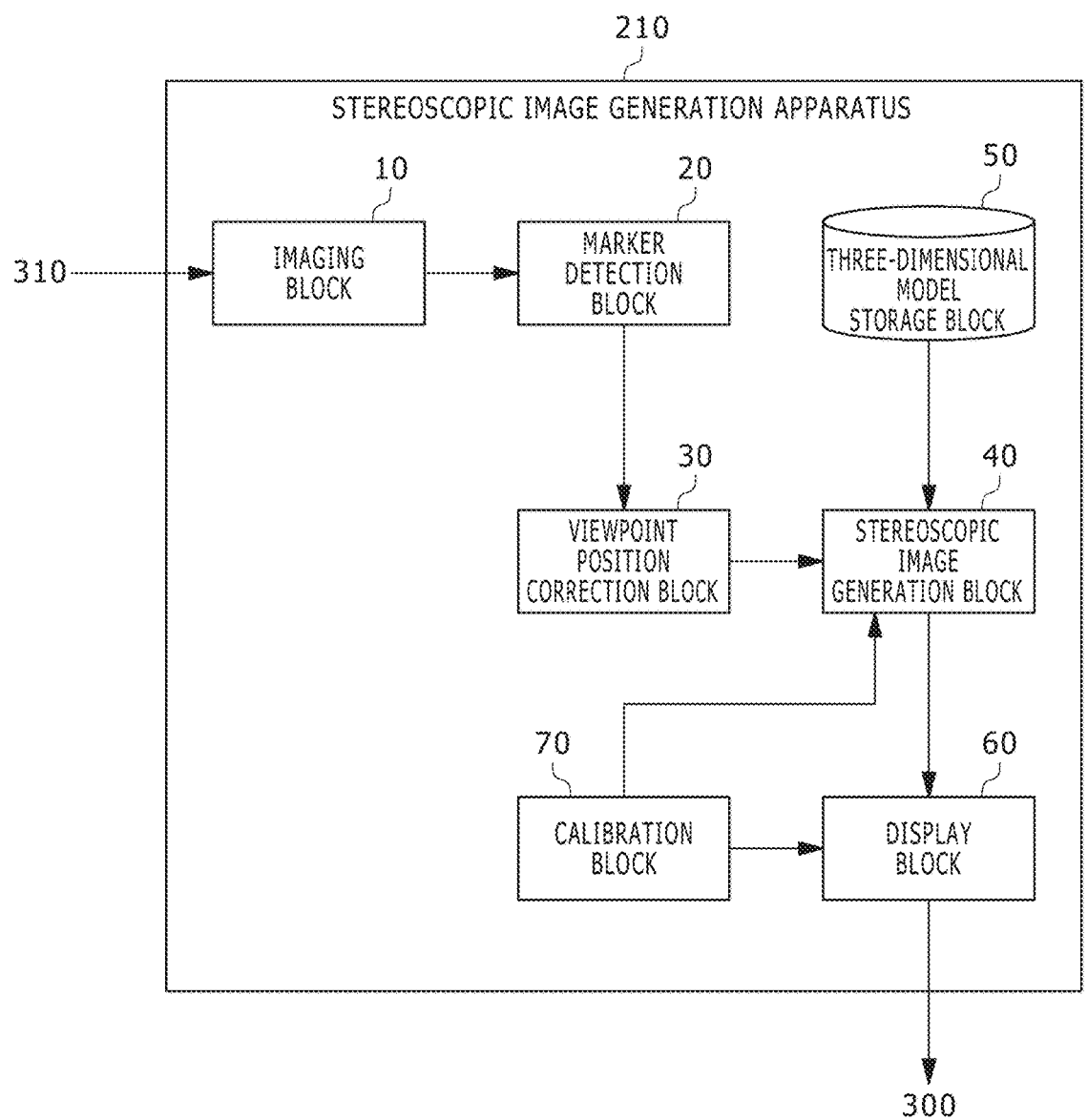
FIG. 6 is a diagram illustrating a functional configuration of a stereoscopic image generation apparatus related with the present embodiment.

Referring to FIG. 6, there is depicted a functional configuration diagram illustrating a stereoscopic image generation apparatus 210 related with the present embodiment. In the figure, a block diagram is drawn with attention to functions that can be realized in a variety of forms; by hardware only, by software only, or combinations thereof.

The stereoscopic image generation apparatus 210 is mounted on the game machine 200 connected to the display 300; it is also possible to mount at least some of the functions of the stereoscopic image generation apparatus 210 into a control block of the display 300. Alternatively, at least some of the functions of the stereoscopic image generation apparatus 210 may be mounted on a server connected to the game machine 200 via a network.

An image block 10 stores into a memory an image of the head of the user wearing the headband-with-markers 100, the image being taken by the camera 310. A marker detection block 20 scans the taken image to detect the two-dimensional coordinates of the head-top marker 110T, the left-side head marker 110L, and the right-side head marker 110R, supplying the detected two-dimensional coordinates to a viewpoint position correction block 30.

On the basis of the two-dimensional coordinates of the head-top marker 110T, the left-side head marker 110L, and the right-side head marker 110R obtained from the marker detection block 20, the viewpoint position correction block 30 corrects the viewpoint position and gives the information about the updated viewpoint position to a stereoscopic image generation block 40. It should be noted here that the viewpoint position correction block 30 executes the correction of viewpoint position without use of the coordinates of the Z direction, namely, the information of depth, of the markers 110T, 110L, and 110R.

The stereoscopic image generation block 40 reads a three-dimensional model of an object to be displayed from a three-dimensional model storage block 50, generates an image for the left eye and an image for the right eye having a parallax given when viewed from the updated viewpoint position supplied from the viewpoint position correction block 30, and supplies the generated images to a display block 60. The display block 60 displays the received image for the left eye and image for the right eye on the display 300.

A calibration block 70 instructs the stereoscopic image generation block 40 to generate a three-dimensional object for calibration. In addition, the calibration block 70 instructs the display block 60 to display on the display 300 a message for prompting the user to feel for a wearing position at which the three-dimensional object for calibration does not move even if the head is moved by adjusting the wearing position of the headband-with-markers 100. The display block 60 displays a parallax image of the three-dimensional object for calibration onto the display 300 and, at the same time, a message for prompting the user to adjust the wearing position of the headband-with-markers 100 onto the display 300. This message may be given to the user in an audible manner.

Figure 7:
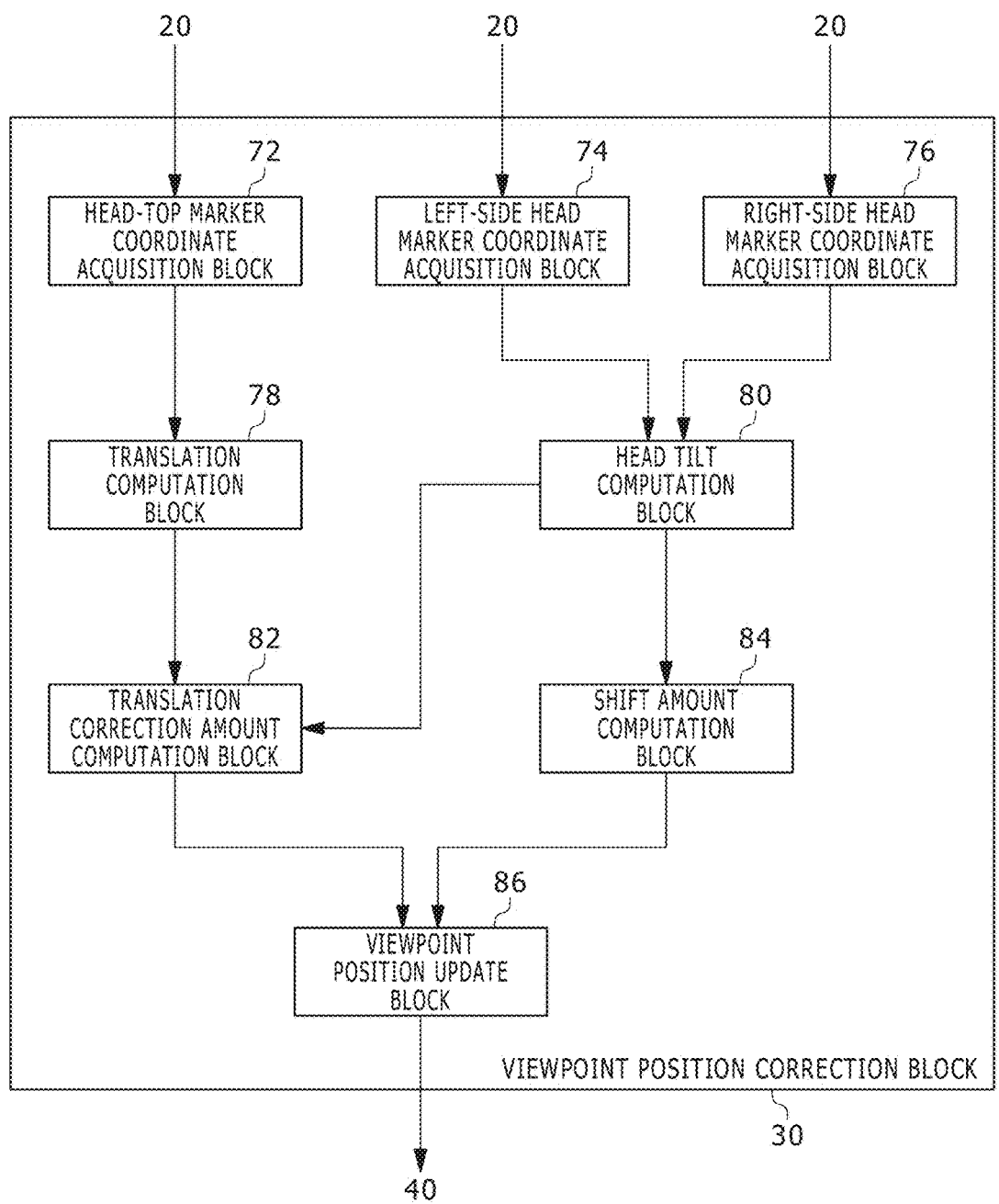
FIG. 7 is a diagram illustrating a detailed functional configuration of a viewpoint position correction block depicted in FIG. 6.

Referring to FIG. 7, there is depicted a detailed functional configuration diagram of the viewpoint position correction block 30. A head-top marker coordinate acquisition block 72, a left-side head marker coordinate acquisition block 74, and a right-side head marker coordinate acquisition block 76 acquire the coordinate positions of the head-top marker 110T, the left-side head marker 110L, and the right-side head marker 110R, respectively, from the marker detection block 20.

A translation computation block 78 detects a translation of the user's viewpoint by use of the two-dimensional coordinate of the head-top marker 110T.

A head tilt computation block 80 computes a tilt angle of the user's head by use of the two-dimensional coordinates of the left-side head marker 110L and the right-side head marker 110R and gives the obtained tilt angle to a translation correction amount computation block 82 and a shift amount computation block 84.

The translation correction amount computation block 82 computes a translation correction amount of the viewpoint position from the translation of the user viewpoint and the tilt angle of the user's head and gives the obtained translation correction amount to a viewpoint position update block 86.

The shift amount computation block 84 computes a shift amount of the viewpoint position according to the tilt of the user's head by use of the tilt angle of the user's head and gives the obtained shift amount to the viewpoint position update block 86.

The viewpoint position update block 86 updates the viewpoint position by use of the translation correction amount and shift amount of the viewpoint position and supplies the information about the obtained updated viewpoint position to the stereoscopic image generation block 40.

Figure 8:
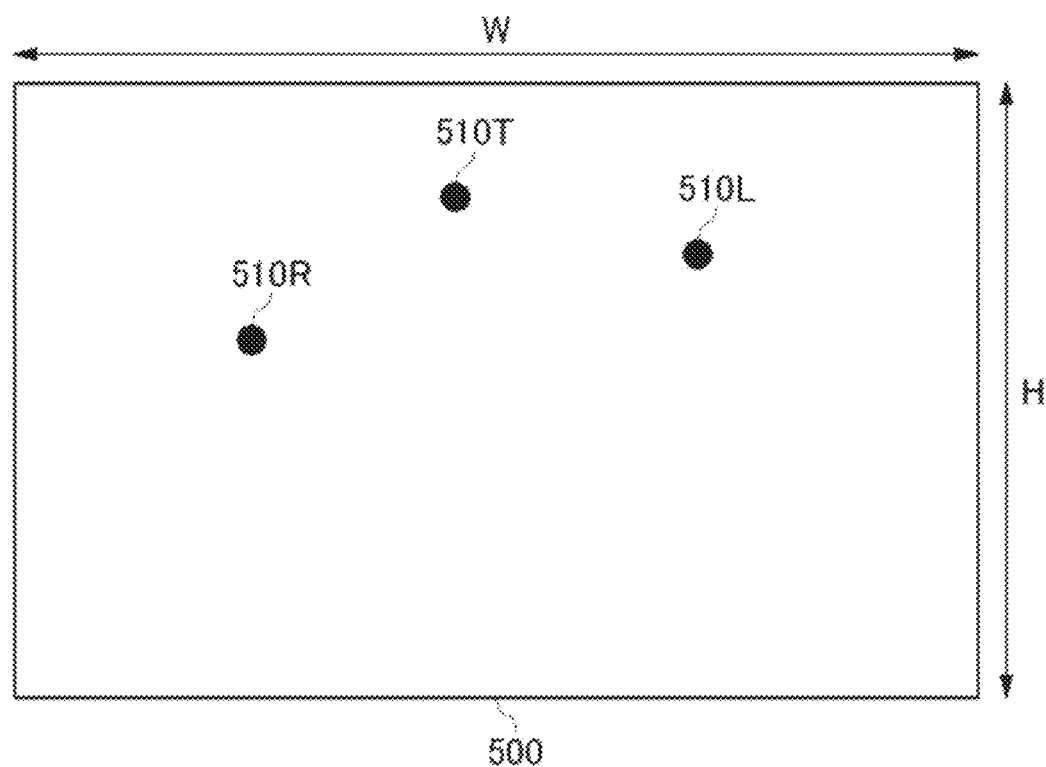
FIG. 8 is a diagram illustrating a head-top marker, the left-side head marker, and the right-side head marker on an image taken by the camera.

Referring to FIG. 8, there is depicted a diagram illustrating the head-top marker 110T, the left-side head marker 110L, and right-side head marker 110R in a taken image 500 provided by the camera 310. The taken image 500 is W pixels wide and H pixels high. With the upper left of the taken image 500 being "0, 0," the marker detection block 20 obtains, in units of pixels, the two-dimensional coordinate (wposT, hposT) of the head-top marker 110T, the two-dimensional coordinate (wposL, hposL) of the left-side head marker 110L, and the two-dimensional coordinate (wposR, hposR) of the right-side head marker 110R.

FIGS. 9(*a*) and 9(*b*) are diagrams illustrating a method in which the marker detection block 20 scans the taken image 500 to detect the head-top marker 110T, the left-side head marker 110L, and the right-side head marker 110R.

First, as depicted in FIG. 9(*a*), the taken image 500 is scanned line by line from the upper left to detect the head-top marker 110T. When the two-dimensional coordinate (wposT, hposT) of the head-top marker 110T has been detected, the taken image 500 is divided into a left area and a right area at the position of the head-top marker 110T as depicted in FIG. 9(*b*); in the left area, the taken image 500 is scanned line by line from the top to detect the two-dimensional coordinate (wposR, hposR) of the right-side head marker 110R and, in the right area, the taken image 500 is scanned line by line from the top to detect the two-dimensional coordinate (wposL, hposL) of the left-side head marker 110L.

In this two-step scan, if any of the three markers 110T, 110L and 110R has not been detected, it is handled as an error and the positional coordinates obtained by previous scanning, of the markers 110T, 110L and 110R are used without change.

Figure 10:
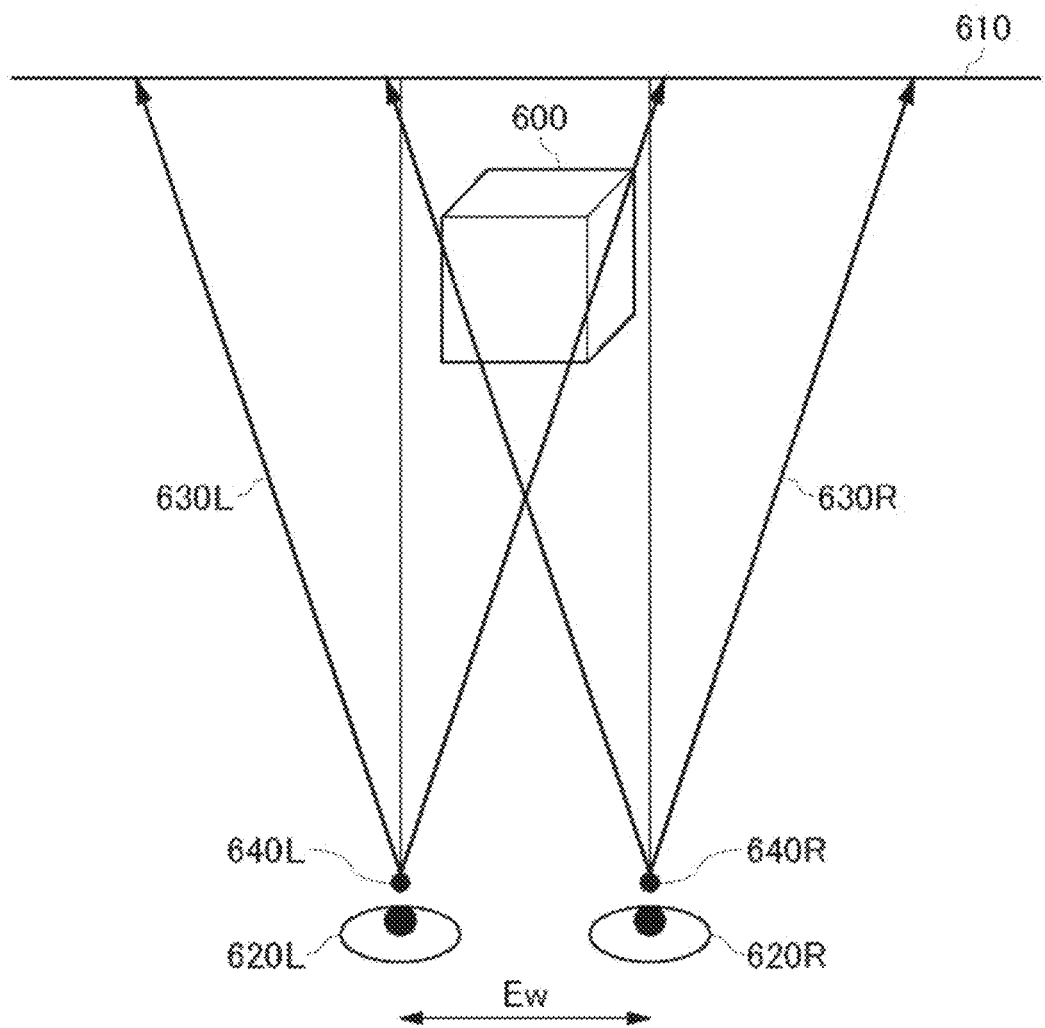
FIG. 10 is a diagram illustrating view frustums for the left and right eyes when a three-dimensional object is stereoscopically displayed on a screen.

Referring to FIG. 10, there is depicted a diagram illustrating a view frustum 630L and a view frustum 630R of the left eye and the right eye, respectively, that are used when stereoscopically displaying a three-dimensional object 600 on a screen 610.

In order to explain an algorithm for correcting viewpoint positions, the following three coordinate systems are defined.

(1) Camera Input Coordinate System

This is a two-dimensional coordinate system of a taken image provided by the camera 310, the unit of the coordinate system being a pixel unit of the taken image.

(2) World Coordinate System

This is a coordinate system of a three-dimensional space in which the three-dimensional object 600 exists. The midpoint between the origin of a perspective projection of the right eye and the origin of a perspective projection of the left eye is the origin of the world coordinate system, the direction toward the screen of the display 300 being Z axis, the horizontal direction being X axis, and the vertical direction being Y axis. The unit of the coordinate system is the unit of the length of a real space.

(3) Display Screen Coordinate System

This is a two-dimensional screen coordinate system represented by a pixel space of the display 300, the unit of the coordinate system being the display pixel unit of the display 300.

A stereoscopic display operation is executed by perspectively projecting the three-dimensional object 600 by use of the view frustum 630L and the view frustum 630R obtained by translating these view frustums 630 by −Ew/2 for the left eye and Ew/2 for the right eye, the interval between a human left eye 620L and a human right eye 620R being Ew. It should be noted that it is considered that the positions of the actual eyeballs are in front of the origins 640L and 640R of the view frustums 630L and 630R; however, in this example, the eye balls are drawn at the positions of the origins 640L and 640R of the view frustum 630L and 630R for the purpose of brevity.

In an actual computation, with the coordinate system of the perspectively converted view frustum fixed, for the left eye, for example, the three-dimensional object 600 is moved on the world coordinate system by −(−Ew/2)=Ew/2 and the resultant generated image is moved in the opposite direction on the screen coordinate system by an amount equivalent to the value mentioned above.

The distance from the screen to the viewpoint is a fixed setting value. It is possible to measure the Z coordinate (depth) of the user's viewpoint by the camera 310; however, because excess computation processing increases the instability of a display image, the Z coordinate is not measured here, thereby executing no correction of the viewpoint position in the Z direction. The viewpoint position is corrected only by use of the two-dimensional coordinate (X, Y) of the marker on the taken image without use of the Z coordinate, so that the influence of errors can be minimized.

Figure 11:
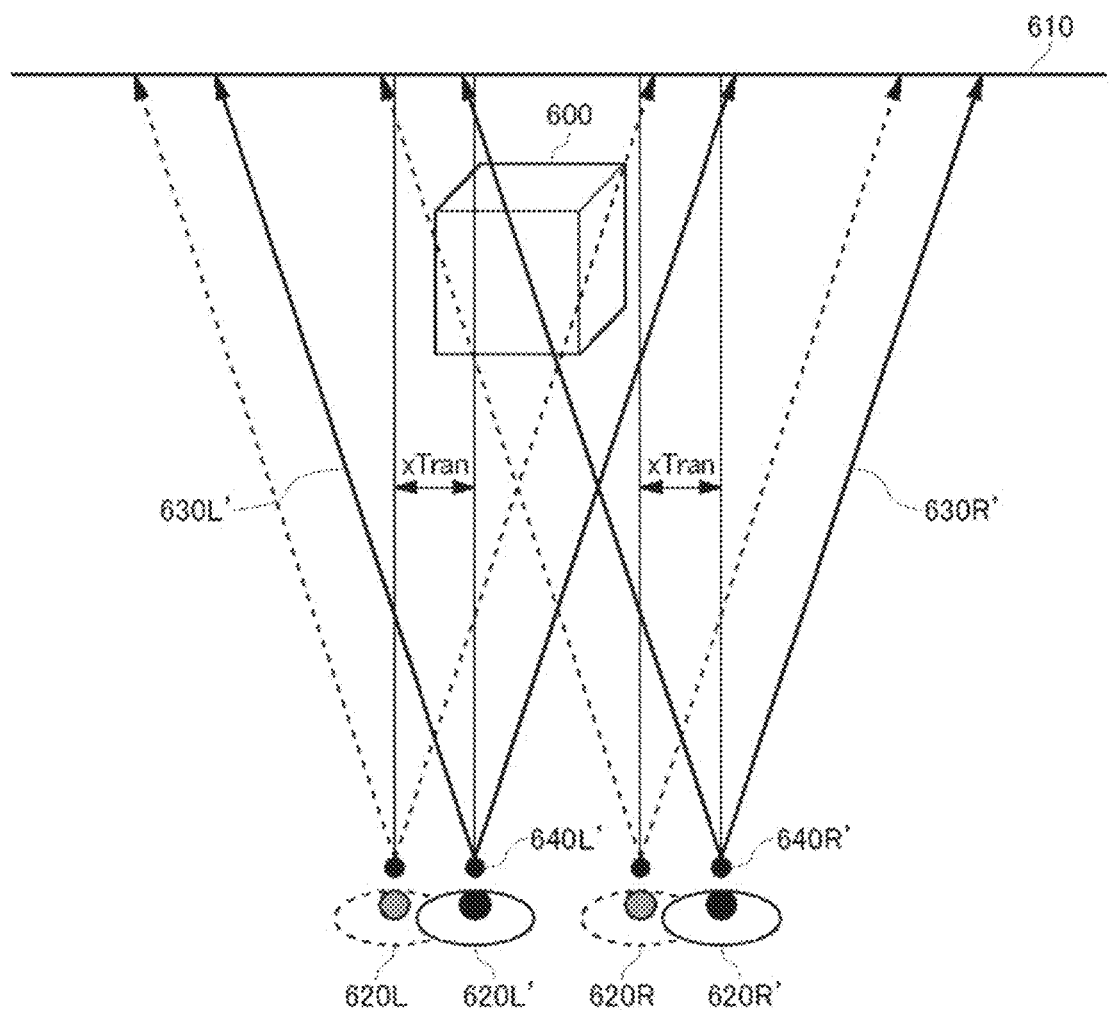
FIG. 11 is a diagram illustrating the translation correction amounts of viewpoint positions when viewpoints are translated.

Referring to FIG. 11, there is depicted a diagram illustrating a translation correction amount on the viewpoint position when the viewpoint is translated. Illustrated are a view frustum 630L' of a left eye 620L' and a view frustum 630R' of a right eye 620R' when the viewpoint is translated in the X axis (the horizontal direction) by xTran.

The translation computation block 78 computes amounts (xTran, yTran) of display position correction in the world coordinate system of the three-dimensional object 600 from the positions (wposT, hposT) of the head-top marker 110T in the camera input coordinate system as follows. This computation presupposes that the both eyes of the user be kept horizontal.

$$x\text{Tran}=-(w\text{pos}T-w\text{Ref})\cdot w\text{Scale}$$

$$y\text{Tran}=(h\text{pos}T-h\text{Ref})\cdot h\text{Scale}$$

In the above, (wRef, hRef) is a reference point defining the center of the camera input coordinate system. If the camera 310 is positioned at the center top of the screen of the display 300, for example, wRef may be the X coordinate of the center position between the left and right view frustums in the camera input coordinate system; if the center of the perspective conversion of the both human eyes is at the origin of the world coordinate system, then hRef may be the Y coordinate of the position of the head-top marker 110T that is detected by the camera 310.

wScale and hScale are scaling coefficients for converting a marker pixel position obtained on the camera input coordinate system into the coordinate system of a world space. Originally, a function with the distance from the camera to the marker being a variable is provided; however, in the case of this technique, in order to presuppose that a user does viewing near an optimum position relative to the display 300, so that the processing is executed by use of a constant value.

In addition, a tilt in the world coordinate system of the user's head is measure from a relation between the two-dimensional coordinate (wposL, hposL) of the left-side head marker 110L in the camera input coordinate system and the two-dimensional coordinate (wposR, hposR) of the right-side head marker 110R in the camera input coordinate system. In this case also, the tilt in the Z direction in the world coordinate system is ignored and the tilt on the two-dimensional plane parallel to the camera coordinate system and the screen coordinate system is handled. Let the angle of this tilt be vAngle. vAngle can be obtained from an equation below.

$$v\text{Angle} = \arctan((h\text{posR} - h\text{posL})/(w\text{posR} - w\text{posL}))$$

The translation correction amount computation block 82 further corrects the above-mentioned translation correction amounts xTran and yTran obtained on the assumption that there is no head tilt by use of head tilt angle vAngle as follows.

$$x\text{Tran} = (-(w\text{pos0} - w\text{Ref}) + h\text{Dist} \cdot \sin(v\text{Angle})) \cdot w\text{Scale}$$

$$y\text{Tran} = (h\text{pos0} - h\text{Ref} + h\text{Dist} \cdot (1 - \cos(v\text{Angle}))) \cdot h\text{Scale}$$

It should be noted that hDist denotes a distance between the position of the head-top marker 110T on the camera input coordinate system and the reference position (the origin of the world coordinate system) of both the eyes of the user.

FIGS. 12(a) and 12(b) are diagrams illustrating a change in positions of the head-top marker 110T depending on head tilt angle vAngle. FIG. 12(a) depicts a position of the head-top marker 110T with both the user's eyes being horizontal, the head-top marker 110T being away from the center of both the user's eyes by hDist. FIG. 12(b) is indicative of a position of the head-top marker 110T when both the user's eyes tilt to the horizontal direction by angle vAngle, the head-top marker 110T being displaced in the horizontal direction (X axis) by hDist·sin(vAngle) and, in the vertical direction (Y axis) by hDist·(1−cos(vAngle)). Taking this displacement into consideration, translation correction amounts xTran and yTran are corrected as indicated by the equation mentioned above.

Thus, the translation correction amounts xTran and yTran obtained by also considering head tilts are values that are obtained by estimating how much the center between the view frustums of perspective projection for stereoscopic view is shifted from the origin of the world coordinate system, on the basis of the change in the two-dimensional coordinates of the three markers head-top marker 110T, left-side head marker 110L, and the right-side head marker 110R of the camera input coordinate system.

FIG. 11 depicts the movement of the view frustums when only the horizontal direction is taken into consideration; the same holds with respect to the vertical direction. As seen from FIG. 11, this movement can be obtained by moving the actual three-dimensional object 600 by −xTran and −yTran in the world coordinate system and, further, by moving a generated image by an amount equivalent to xTran and yTran in the screen space.

The correction amounts xAdj and yAdj in pixel unit in this screen space are expressed by equations below.

$$x\text{Adj} = -x\text{Tran}/s\text{Scale}$$

$$y\text{Adj} = -y\text{Tran}/s\text{Scale}$$

It should be noted that sScale is a coordinate conversion coefficient in conversion from the world coordinate system to the screen coordinate system. If the ratios differ with each other in X direction and Y direction, values corresponding to the different ratios must be used.

When the user rotates or moves his or her head to the left or the right, the center between the view frustums is shifted from the origin of the world coordinate system. If the left and right parallax images are displayed on the display 300 without correcting the viewpoint position relative to this shift, the stereoscopic video is viewed swinging according to the translation or rotation of the user's head, resulting in dizziness. In the present embodiment, the viewpoint position is updated by obtaining translation correction amounts xTran and yTran and the left and right parallax images viewed from the updated viewpoint position are generated to be displayed on the display 300. Consequently, no swinging occurs on a stereoscopic video in accompaniment with a viewpoint shift if the user unintentionally moves his or her head, thereby providing stable stereoscopic videos.

FIGS. 13(a) and 13(b) are diagrams illustrating the displacement in the center between the view frustums resulting when the user tilts his or her head.

As depicted in FIG. 13(a), if the positions of both the user's eyes 620L and 620R are kept horizontal, a binocular image may be generated for stereoscopic view by translating the view frustums 630L and 630R for perspective conversion by Ew/2 each.

As depicted in FIG. 13(b), if both the user's eyes are tilted, the view frustum 630L of the left eye and the view frustum 630R of the right eye are shifted in a diagonal direction, so that the shift amount computation block 84 executes shift correction on the view frustum translation amount by use of tilt vAngle of both the user's eyes obtained from the Left-side head marker 110L and the right-side head marker 110R.

This correction is expressed by the following equations with shift correction amounts xshift and yshift of the left and right eye positions on the world coordinate system.

For the left eye:

$$x\text{Shift} = (Ew/2) \cdot \cos(v\text{Angle})$$

$$y\text{Shift} = -(Ew/2) \cdot \sin(v\text{Angle}).$$

For the right eye:

$$x\text{Shift} = -(Ew/2) \cdot \cos(v\text{Angle})$$

$$y\text{Shift} = (Ew/2) \cdot \sin(v\text{Angle}).$$

In order to actually execute this correction, the expression is executed as a computation for moving an object in the reverse direction with the position of the view frustum kept unmoved. Hence, an image obtained on the screen coordinate system is moved in the opposite direction by an amount equivalent to the value mentioned above.

Also in the screen space, the shift correction corresponding to that mentioned above is executed. Let the shift amounts be xShiftAdj and yShiftAdj, then these are expressed by the following equations for both the left and right eyes.

$$x\text{ShiftAdj} = -x\text{Shift}/s\text{Scale}$$

$$y\text{ShiftAdj} = -y\text{Shift}/s\text{Scale}$$

The viewpoint position update block 86 obtains the movement amount of the viewpoint position by adding the translation correction amounts xTran and yTran to the shift correction amounts xshift and yshift, thereby updating the viewpoint position. It should be noted that it is optional to correct the viewpoint position by considering a head tilt shift correction amount; the viewpoint position may be corrected by use of only a translation correction amount with a head tilt not considered by assuming vAngle=0 under the condition that the user keeps his or her head horizontal.

Figure 14:
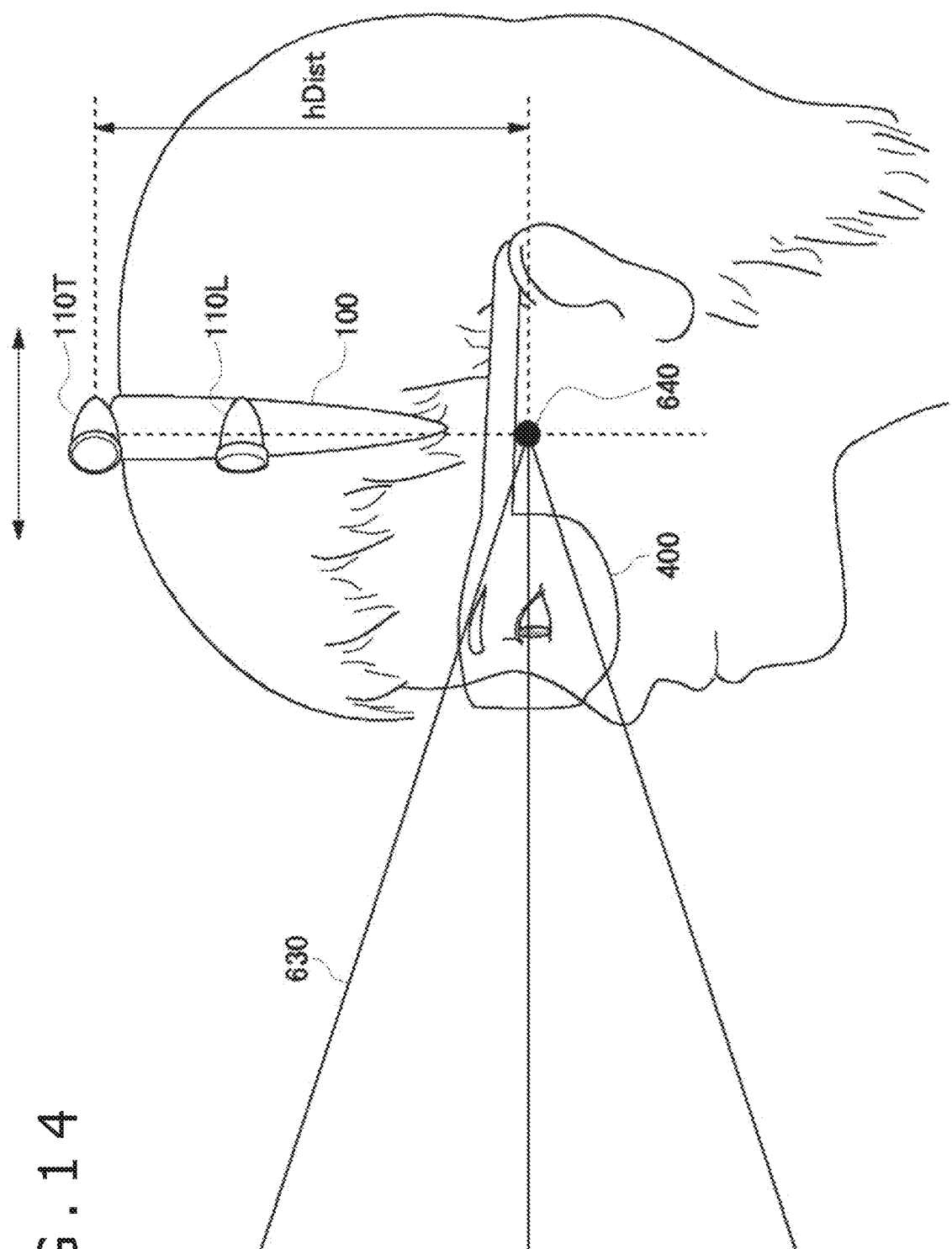
FIG. 14 is a diagram illustrating a relation between the wearing position of the headband-with-markers and the projection origin of the view frustum.

Referring to FIG. 14, there is depicted a diagram illustrating a relation between the wearing position of the headband-with-markers 100 and the projection origin of the view frustum.

A projection origin 640 of a view frustum is the focal position of the human eyes and is considered to be deeper than the actual eye position. Here, because there are two view frustums, the left and the right, the projection origin 640, to be exact, is the midpoint between the projection origins of these view frustums; however, the projection origin 640 is called the projection origin of a view frustum for the purpose of brevity.

With a viewpoint position correction algorithm, an image is corrected by use of the projection origin 640 of view frustum as the origin of the world coordinate system. This assumes that the head-top marker 110T of the headband 100 for use as the reference for the detection of a viewpoint position is at a position just above the origin of the world coordinate system, namely, a position just above the projection origin 640 of view frustum by hDist.

However, because the projection origin of view frustum is a focal position of human eyes, this position cannot be directly measured in a normal manner. Therefore, markers are assembled in an accessory that is forward and backward adjustable in wearing position and worn on the head like the headband 100 and the user adjusts the wearing position of the headband 100 by himself or herself so as to be able to naturally view a stereoscopic image displayed on the screen, thereby making it possible to set the projection origin of a view frustum such that the setting is ideal for each user.

The calibration block 70 instructs the stereoscopic image generation block 40 and the display block 60 to generate a parallax image of a three-dimensional object for calibration and display the generated image onto the display 300. The calibration block 70 instructs the user to forward or backward adjust the wearing position of the headband-with-markers 100 by text or sound on the screen.

Viewing the parallax image of the three-dimensional object for calibration displayed on the display 300 through the stereoscopic vision glasses 400, the user adjusts the wearing position of the headband 100 forward or backward such that the three-dimensional object for calibration does not move if the user rotates or moves his or her head to the left or the right. When the head-top marker 110T of the headband 100 is positioned just above the projection origin 640 of view frustum of this user, the viewpoint position correction algorithm works effectively, thereby preventing the three-dimensional object for calibration from being moved even if the head is moved. This completes the calibration and the calibration block 70 instructs the stereoscopic image generation block 40 and the display block 60 to end the generation and display of the parallax image of the three-dimensional object for calibration.

In a conventional method, markers are mounted on the surface of the stereoscopic vision glasses 400, for example, to be taken by a camera and the projection origin of the view frustum is computed by three-dimensionally measuring the positions of the markers. However, in the case where markers are mounted on the stereoscopic vision glasses 400, there is an offset from the projection origin of view frustum in Z direction, so that correct information in depth direction is required to obtain the projection origin of view frustum from marker positions, thereby making the computation complicated. In addition, even if the markers of the stereoscopic vision glasses 400 are taken, it is difficult to make distinction between the rotation and translation of the head of the user, making it easy to cause errors in positional measurement. Further, this method requires a computation for the focal position of the eyes of each user, thereby making it necessary to execute a time consuming calibration process while requiring the user to execute menu operations.

By contrast, in the present embodiment, the head-top marker 110T is adjusted just above the projection origin of the view frustum, so that there is no offset between the head-top marker 110T and the projection origin of the view frustum in the Z direction, resulting in a simplified viewpoint position correction computation. In addition, the calibration technique according to the present embodiment allows the realization of the adjustment matching the focal position of the eyes of each user by a very intuitive method of physically shifting the wearing position of the headband 100 forward or backward by the user, resulting in the execution of calibration that is easy for every user. Further, the number of positions of the markers to be detected is small, so that the influence of the error for each marker is minimized, thereby providing very stable calibration.

FIGS. 15(*a*) and 15(*b*) are diagrams illustrating advantages that are obtained by not executing the correction of a viewpoint position in the Z direction. In the present embodiment, the computation is simplified by intentionally omitting the correction of a viewpoint position for the movement in the depth direction of the viewpoint. This also brings about other advantages.

FIG. 15(*a*) depicts a positional relation between the view frustum 630, the three-dimensional object 600, and the screen 610. When the origin 640 of the view frustum 630 is at this position, the entire three-dimensional object 600 comes inside the view frustum 630, so that the entire image of the three-dimensional object 600 is displayed on the screen 610.

FIG. 15(*b*) depicts a positional relation when the viewpoint moves in the Z direction. If the position of the viewpoint in the Z direction is corrected when the viewpoint approaches the screen 610, part of the three-dimensional object 600 gets out of the view frustum 630, so that the image of the three-dimensional object 600 rides over the edge of the screen 610.

As generally known, in the case of stereoscopic view display, if an object rides over the edge of an image, the processing of frame correction, if any, involves unnatural viewing. However, if the correction of the viewpoint position in the Z direction is not necessarily executed, the possibility that the object partially rides over the edge of an image is minimized though the object is viewed somewhat shrunk in the Z direction, thereby resulting in the keeping of an image easy to view. Thus, that the correction of the viewpoint position in the Z direction is not necessarily executed not only makes simple the viewpoint position correction algorithm but also provides a secondary effect that the maintenance of naturally looking stereoscopic view display can be facilitated even if the viewpoint approaches the screen.

It should be noted that, in the above description, advantages were explained supposing that no Z-direction correction be done; in the present embodiment, however, it is also possible to add easy correction of the viewpoint position in the Z direction without adding another measurement device.

For example, it is possible to obtain a line connecting a point (wposL, hposL) and another point (wposR, hposR) from the two-dimensional coordinate (wposT, hposT) of the head-top marker 110T, the two-dimensional coordinate (wposL, hposL) of the left-side head marker 110L, and the two-dimensional coordinate (wposR, hposR) of right-side head marker 110R, detect a change in the distance between the obtained line and the two-dimensional coordinate (wposT, hposT) of the head-top marker 110T, and approximately correct the distance d between the head-top marker 110T and the screen.

Thus, it is also possible to correct the depth direction without obtaining the correct coordinate values in the depth direction of each of the head-top marker 110T, the left-side head marker 110L, and the right-side head marker 110R.

Figure 16A:
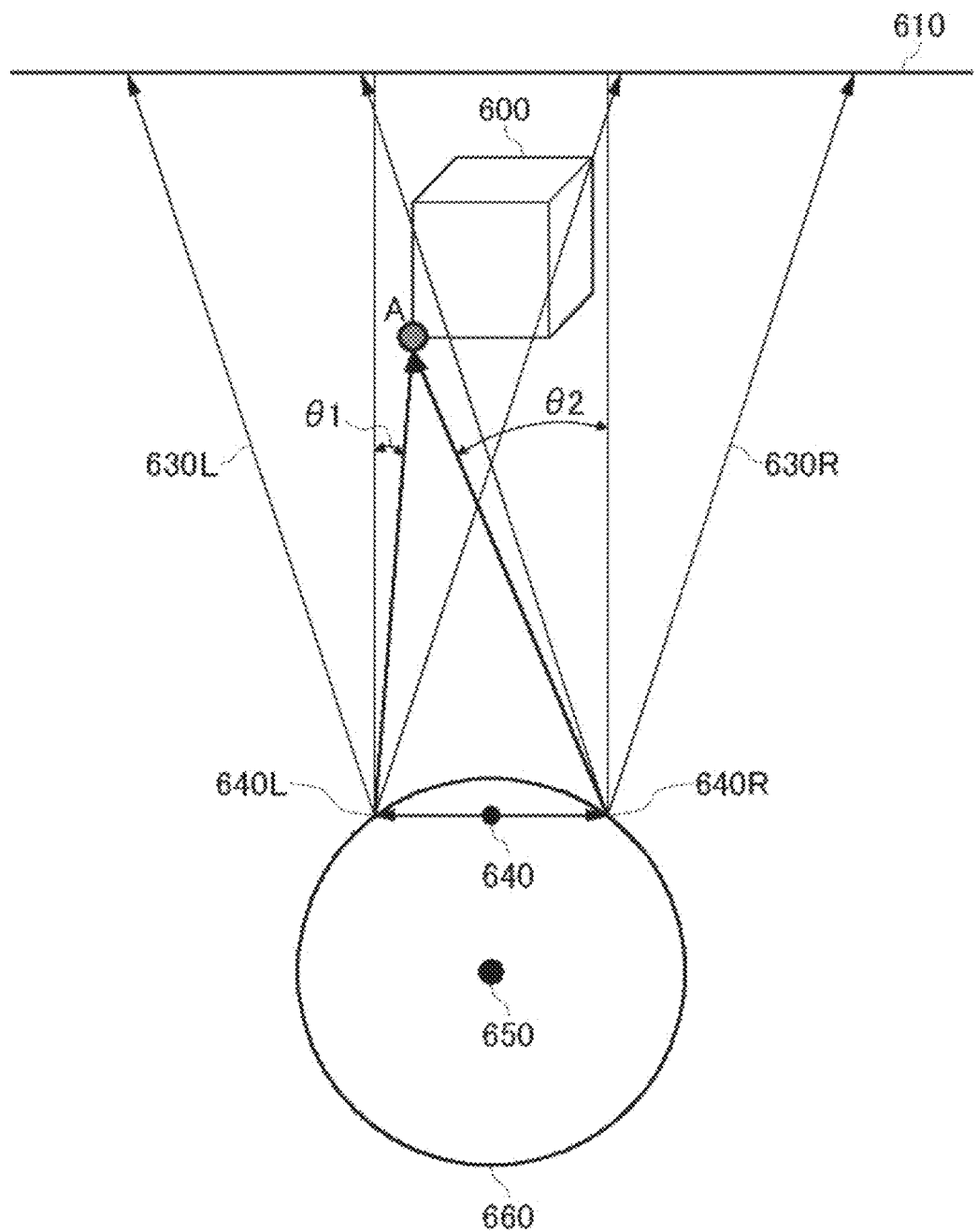
FIG. 16A is a diagram illustrating a positional relation between the view frustums, the three-dimensional object, and the screen that are viewed down from just above the head of the user.
Figure 16B:
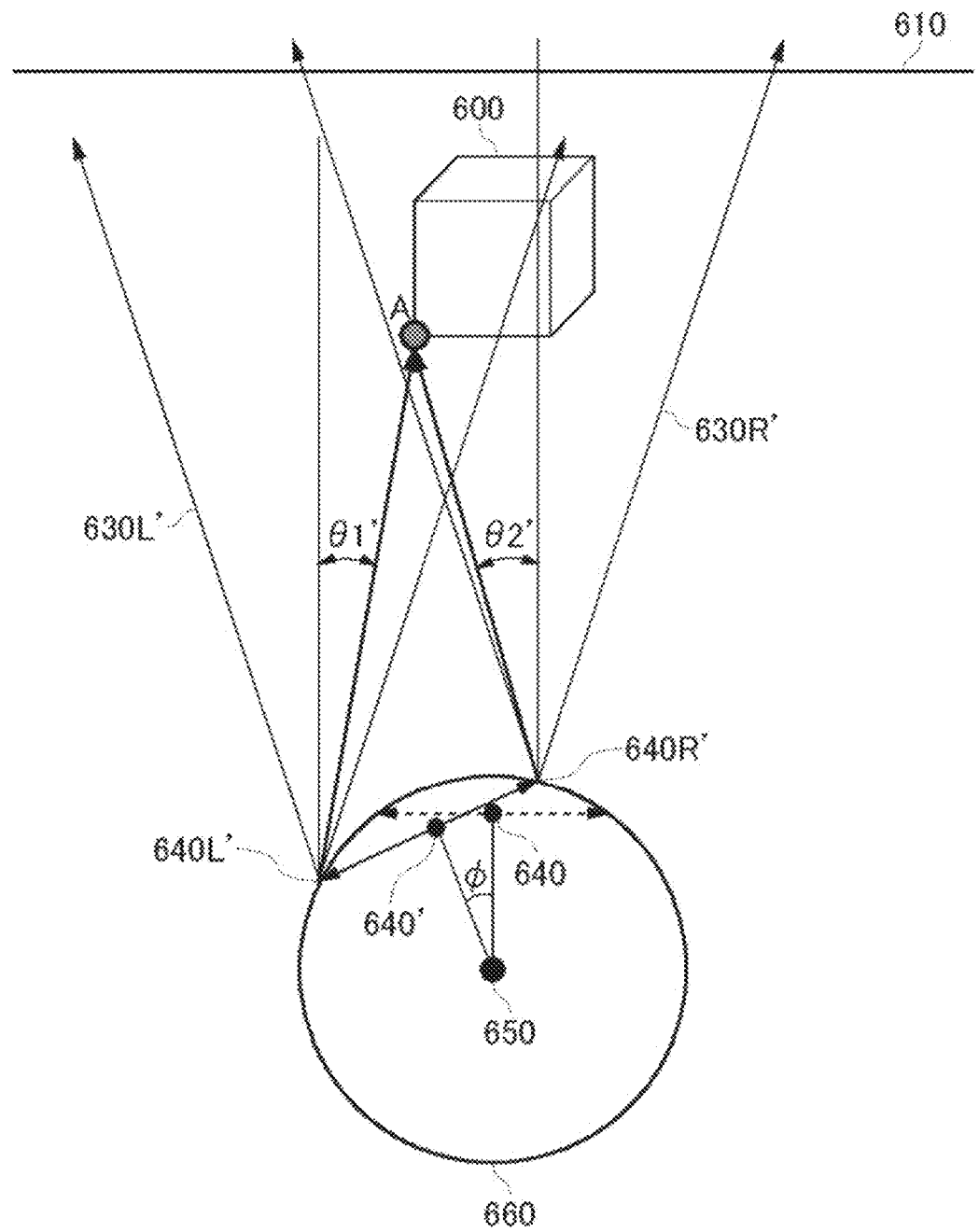
FIG. 16B is a diagram illustrating the new view frustums obtained when the user rotates his or her head.
Figure 16C:
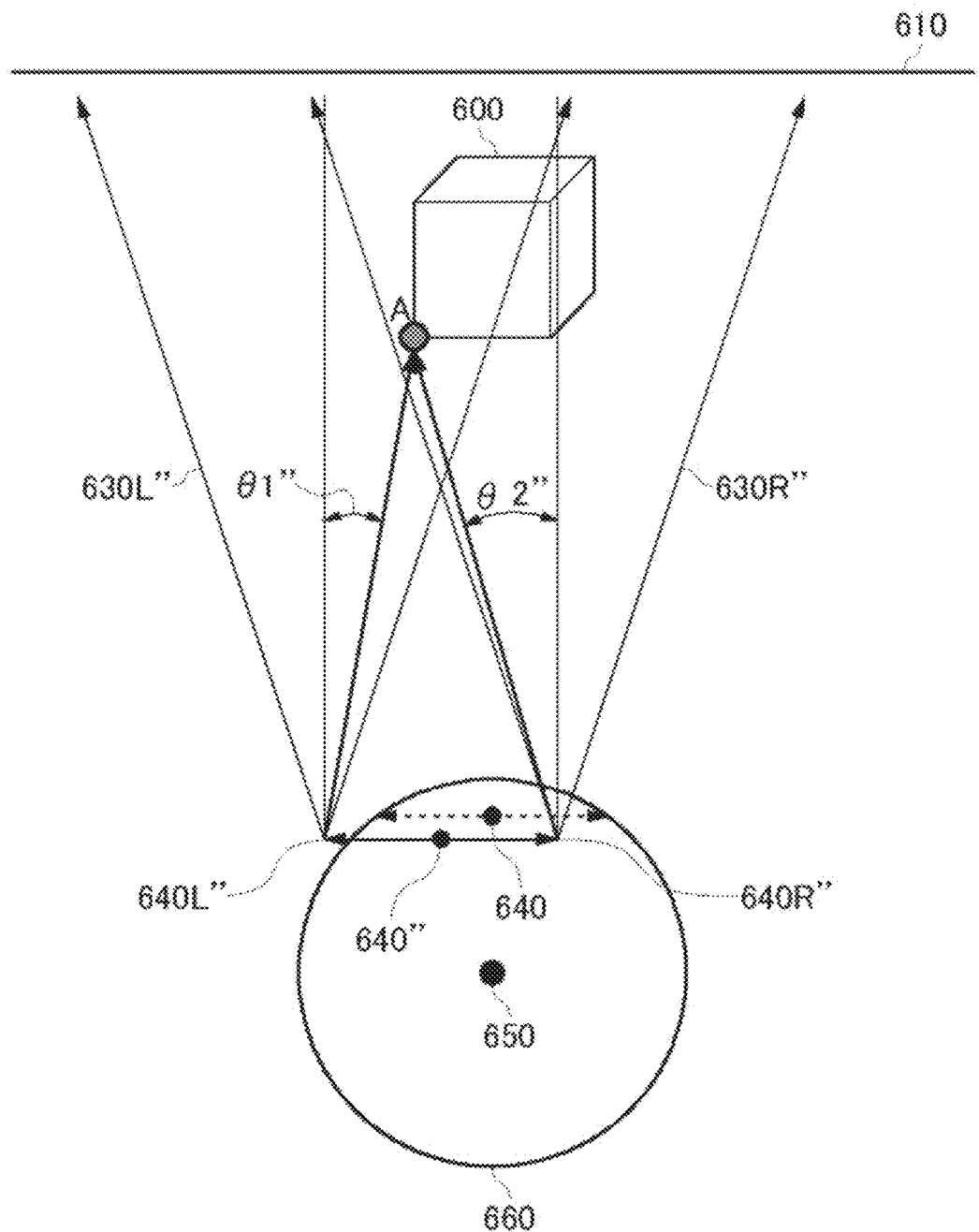
FIG. 16C is a diagram illustrating the approximate view frustums obtained when the user rotates his or her head.

The following illustrates with reference to FIGS. 16A through 16C and by use of a human stereoscopic view model, that it is possible to execute calibration by adjusting the position of the head-top marker 110T of the headband 100 such that a stereoscopically viewed object can be viewed as being at a standstill.

FIG. 16A is a diagram illustrating a positional relation between the view frustums 630L and 630R, the three-dimensional object 600, and the screen 610 as viewed from just above a head 660 of a user. In this diagram, the user is directing his or her head 660 directly to right in front of the screen 610. Here, reference numeral 640 is indicative of the midpoint between the origin 640L of the left-eye view frustum 630L and the origin 640R of the right-eye view frustum 630R. Reference numeral 650 is indicative of the rotational axis of the head 660.

The user views the position (Ax, Az) of a point A on the three-dimensional object 600 from the origins 640L and 640R of the left and right view frustums 630L and 630R, respectively. It is considered that the user estimates the position of the point A in the three-dimensional space such that the point A on the three-dimensional object 600 is in the direction at an angle θ1 to the direct front direction of the left-eye view frustum 630L and in the direction at an angle θ2 to the direct front direction of the right-eye view frustum 630R.

FIG. 16B is a diagram illustrating new view frustums 630L' and 630R' that are obtained when the user rotates the head 660. The user views the point A on the three-dimensional object 600 by moving the eyeballs in a state in which the head 660 is turned by a rotational angle φ around the rotational axis 650.

The user views the position of the point A from the origins 640L' and 640R' of the left and right view frustums 630L' and 630R', the point A being in the direction of an angle θ1' to right in front of the left-eye view frustum 630L' and in the direction of an angle θ2' to right in front of the right-eye view frustum 630R'. Since θ1'>θ1, θ2'<θ2, the point A moves in the direction reverse to the rotational direction of the head 660; however, at this point of time, the human being recognizes that the point A is at a standstill, so that it is considered that the human being cognitively executes angle correction for line-of-sight angles θ1' and θ2'.

It is considered that the human being has no sensor for directly knowing the position of the eyeballs, so that it is considered that the human being estimates the movement of the position of the origin of the two virtual left and right view frustums from the rotating of own head and executes angle correction on new line-of-sight angles θ1' and θ2' for viewing from that position, thereby recognizing that the point A is at a standstill. Because of this human being's cognitive processing, it is considered that, when the headband 100 is worn such that the head-top marker 110T comes just above the midpoint between the origins of two view frustums, the correction processing on the origin positions of the view frustums is precisely executed, allowing the user to view the point A at a standstill even if the head 660 is rotated.

As easily seen from this diagram, if the headband 100 is worn such that the head-top marker 110T is positioned forward from just above the midpoint of the origins of the two view frustums, the point A is viewed as moving in the reverse direction of the rotation direction as the head 660 rotates; if the headband 100 is worn such that the head-top marker 110T is positioned backward from just above the midpoint between the origins of the two view frustums, namely, positioned in the proximity of the rotational center 650 of the head 660, the point A is viewed as moving in the same direction as the rotational direction as the head 660 rotates. Consequently, if the wearing position of the headband 100 is adjusted such that the point A is viewed at a standstill even if the head 660 is rotated, the head-top marker 110T comes just above the midpoint between the origins of the two view frustums.

It should be noted however that the present technique does not execute the correction on the viewpoint position in the Z direction, so that, even if the head 660 is rotated, approximate processing is executed assuming that the origins of the view frustums have been translated as depicted in FIG. 16C without considering the Z direction.

FIG. 16C is a diagram illustrating approximate view frustums 630L" and 630R" resulted from rotation of the head 660 of the user.

The user views the position of the point A from the origins 640L" and 640R" of the left and right view frustums 630L" and 630R" and the point A is in the direction of an angle θ1" to the right in front of the left-eye view frustum 630L" and in the direction of an angle θ2" to the right in front of the right-eye view frustum 630R". As a result of this approximation, θ1">θ1' and θ2"<θ2', so that it is predicted that the point A is viewed as moved slightly to the right from the standstill position; however, the focal position of the human eyes is at a position deeper than the eyeballs, so that, in the present technique, the head-top marker 110 is worn at a position comparatively near the rotational center 650 of the head 660, thereby mostly cancelling a computation error caused by this approximation. Consequently, personally adjusting the position of the head-top marker 110T of the headband 100 allows to configure a display system in which a stereoscopic image is viewed at a standstill.

Figure 17A:
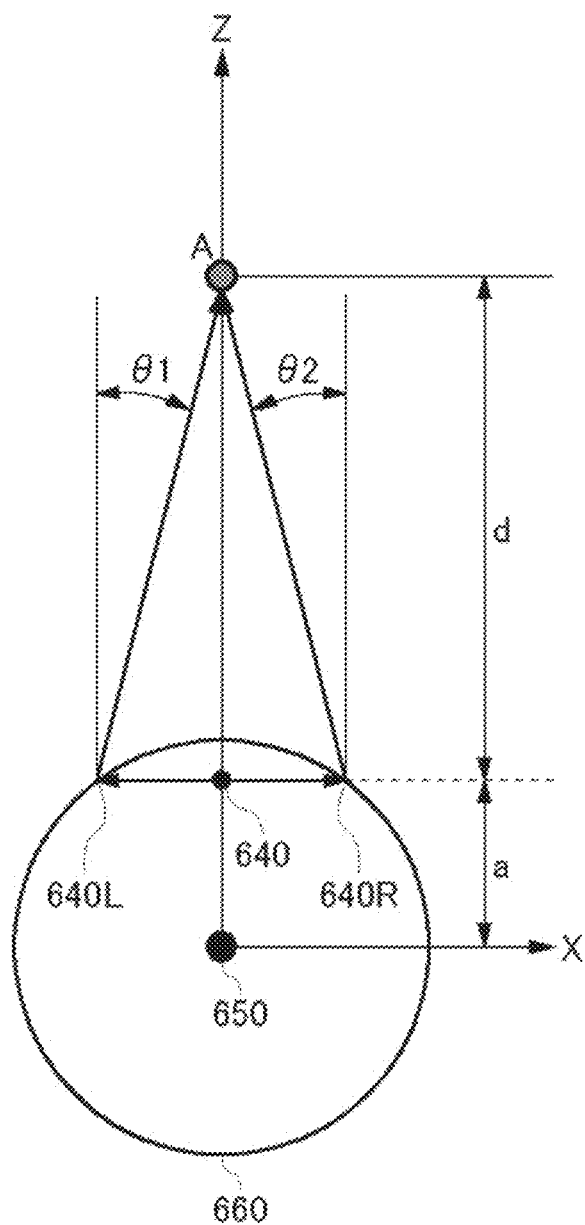
FIG. 17A is a diagram illustrating the line-of-sight angles obtained when the head is directed to the front.
Figure 17B:
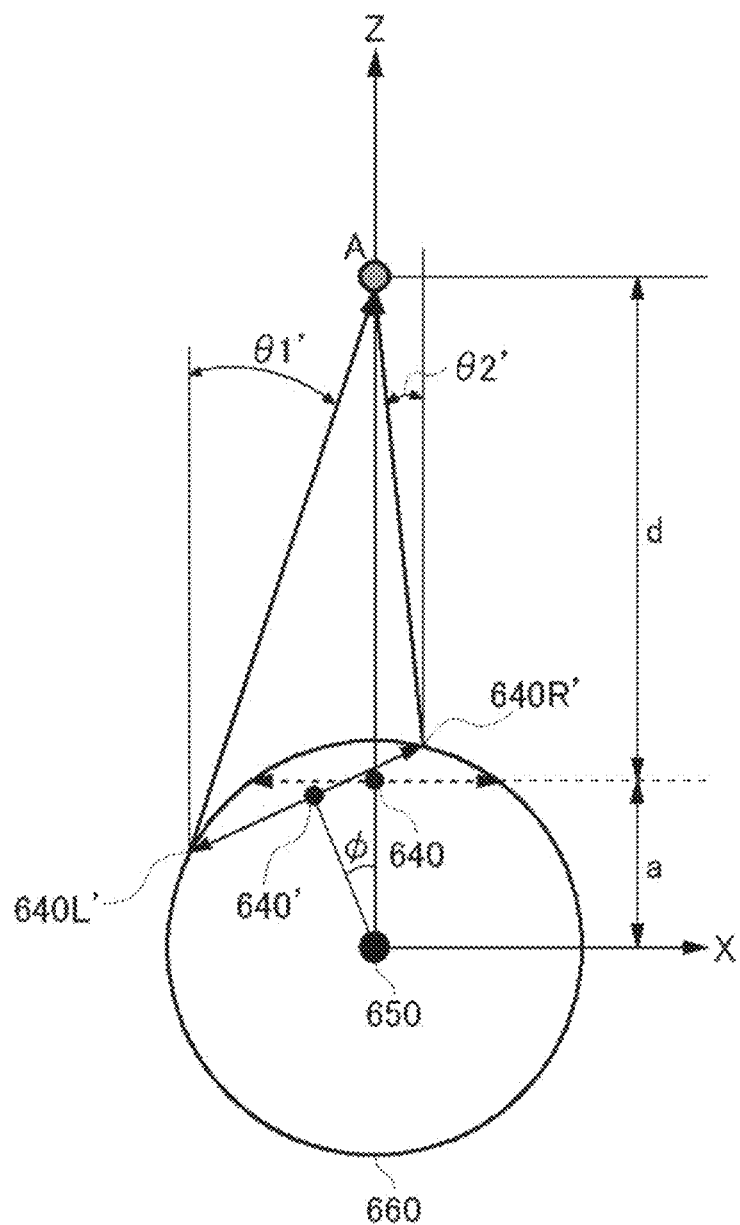
FIG. 17B is a diagram illustrating the line-of-sight angles obtained when the head is rotated by a rotational angle φ.
Figure 17C:
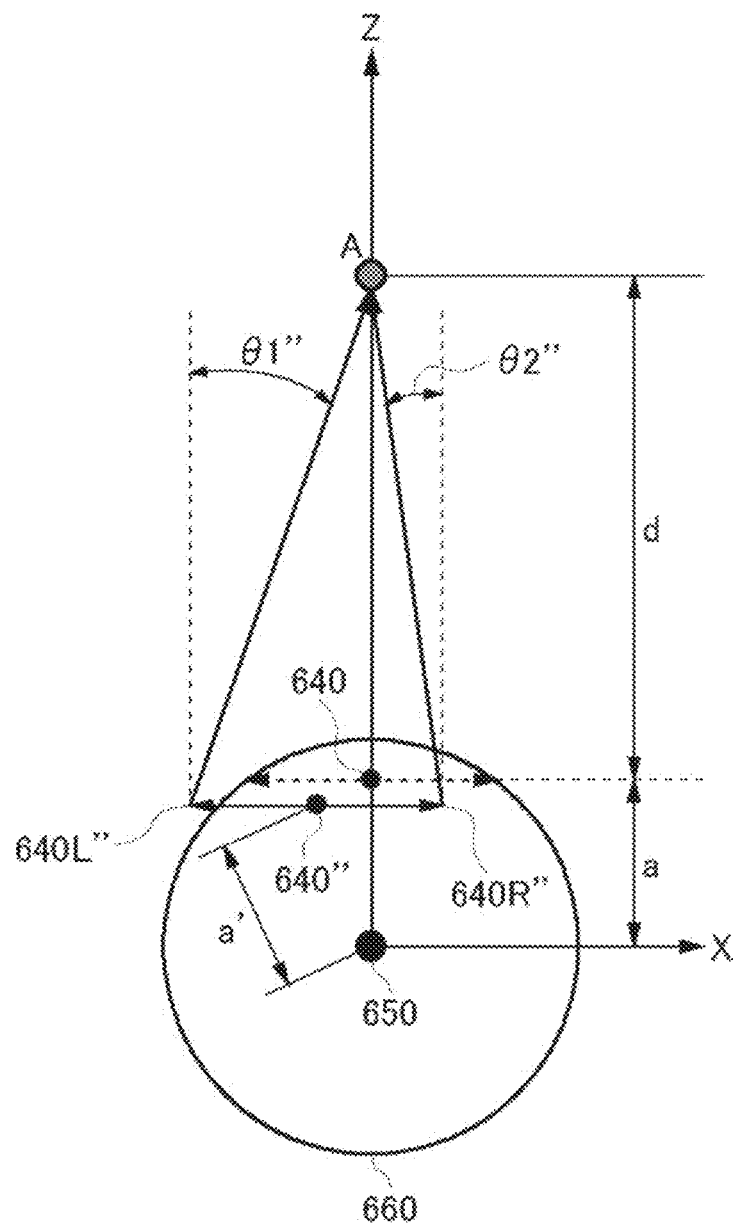
FIG. 17C is a diagram illustrating the line-of-sight angles obtained when the rotation of the head is approximated by translation.

The following describes in detail the validity of the calibration of the present embodiment with reference to FIGS. 17A through 17C. Here, the validity of the present technique is indicated by equations when the point A of the three-dimensional object 600 is at the origin of the horizontal axis (X axis).

FIG. 17A is a diagram illustrating a line-of-sight angle when the head 660 is directed to the front. The user is viewing the position of the point A from the origins 640L and 640R of the left and right view frustums, the point A being in the direction of a line-of-sight angle θ1 of the left eye and in the direction of a line-of-sight angle θ2 (=θ1) of the right eye.

Here, let an interval between the left and right view frustums be Ew, a distance in the Z-axis direction from the midpoint 640 between the origins of the view frustums when there is no rotation of the head 660 to the point A be d, and a distance from the midpoint 640 between the origins of the view frustums to the rotational center 650 of the head 660 be a. Then, if rotational angle of the head φ=0, the line-of-sight angles θ1 and θ2 are expressed by the following equation.

$$\tan θ1 = \tan θ2 = Ew/2d$$

FIG. 17B is a diagram illustrating light-of-sight angles that are obtained when the head 660 is turned by the rotational angle φ. The user is viewing the position of the point A from the origins 640L' and 640R' of the left and right view frustums, the point A being in the direction of a line-of-sight angle θ1' of the left eye and in the direction of a line-of-sight angle θ2' of the right eye. Line-of-sight angles θ1' and θ2' at the rotational angle φ are expressed by the following equations.

$$\tan θ1' = (a·\sin φ + (Ew/2)·\cos φ)/(d + a·(1-\cos φ)) + (Ew/2)·\sin φ))$$

$$\tan θ2' = (-a·\sin φ + (Ew/2)·\cos φ)/(d - a·(1-\cos φ) - (Ew/2)·\sin φ))$$

FIG. 17C is a diagram illustrating line-of-sight angles that are obtained when the rotation of the head 660 is approximated by translation. The user is viewing the position of the point A from the origins 640L" and 640R" of two view frustums, the point A being in the direction of a line-of-sight angle θ1" of the left eye and in the direction of a line-of-sight angle θ2" of the right eye. Let a distance from a midpoint 640" between the origins 640L" and 640R" of two view frustums that are used approximately to the rotational center 650 of the head 660 be a'. Then, line-of-sight angles θ1" and θ2" that are obtained by approximating the rotation of head by translation are expressed by the following equations.

$$\tan θ1'' = (a'·\sin φ + Ew/2)/d$$

$$\tan θ2'' = (-a'·\sin φ + Ew/2)/d$$

Here, if the rotational angle φ is near 0, then the equations of line-of-sight angles θ1' and θ2' at the rotational angle φ and line-of-sight angles θ1" and θ2" obtained by approximation by translation are simplified as follows.

$$\tan θ1' = (a·φ + Ew/2)/(d + (Ew/2)·φ) = (a·φ + Ew/2 - (Ew/2d)·φ)/d$$

$$\tan θ2' = (-a·φ + Ew/2)/(d - (Ew/2)·φ) = (-a·φ + Ew/2 + (Ew/2d)·φ)/d$$

$$\tan θ1'' = (a'·φ + Ew/2)/d$$

$$\tan θ2'' = (-a'·φ + Ew/2)/d$$

Here, if a condition θ1'=θ1" is added, then a'=a−Ew/2d is obtained, resulting in θ2'=θ2". Conditions θ1'=θ1" and θ2'=θ2" denote that there is no distinction between rotation and translation.

In the present technique, the information about the measurement of the marker positions in the Z direction is not used at all; however, wearing the headband 100 such that the head-top marker 110T of the headband 100 comes just above the position away from the rotational center of the head by the distance a'=a−Ew/2d corresponding to the distance d up to an object allows the realization of a display system in which a three-dimensional object can be viewed at a standstill relative to a rotational movement of the head.

If the distance d up to an object is long enough, namely, if an object is positioned far enough, then a'=a is satisfied where wearing the headband 100 such that the head-top marker 110T comes just above the midpoint between the origins of two view frustums allows the user to view the object at a standstill.

If the distance d up to an object is short, namely, an object is positioned near, then it is optimum to wear the headband 100 farther backward from the position of the midpoint between the origins of the two view frustums by Ew/2d. Therefore, in adjusting a wearing position of the headband 100, it is desirable to set the distance d up to an object to an average value to display a three-dimensional object for calibration. It should be noted that this adjustment amount Ew/2d is small enough, so that this adjustment amount may often be practically ignored.

As described above, the reason why the wearing position of the headband 100 includes an adjustment amount dependent on the distance d up to an object to be exact is that the present technique does not measure the position of each marker in the Z direction. In the present technique, only the two-dimensional coordinate of each marker on a taken image is used, so that the correction algorithm for viewpoint positions is simplified and no error is involved in the computation. On the other hand, by finding out a position where an object is viewed at a standstill by adjusting the wearing position of the headband 100, the user can adjust the position of each marker to an optimum position including an adjustment amount Ew/2d depending on the distance d up to the object.

As described above, according to the present embodiment, a user wearing markers made of infrared light diodes, for example, on his or her head, especially, the top of the head and the left and right sides of the head is imaged by an infrared light camera, for example, the two-dimensional coordinates of these markers are detected from the taken image, and a viewpoint position is corrected realtime from the two-dimensional coordinates of the markers, thereby generating a parallax image. Consequently, an object stereoscopically viewed does not move, thereby eliminating uncomfortableness such as dizziness. In addition, more correct three-dimensional shapes can be recognized. Especially, a viewpoint position may be corrected on the rotation around the vertical axis of the head and a tilt of the head to the left or right that are sensuously important so as to prevent the occurrence of unnatural artifacts, thereby presenting natural-looking stereoscopic videos.

The number of markers to be detected is small and the coordinate values in the Z direction are not used, so that the influence of errors in the positional measurement can be reduced. In addition, a viewpoint position is corrected from the two-dimensional coordinates of markers, so that the viewpoint position can be corrected at high speeds with small computation amounts. This small amount of computation results in the mitigation of the latency on the correction processing, thereby also bringing about an effect of reduced dizziness.

Further, the coordinate values in the Z direction of each marker are not required, so that an advantage is provided in which only one camera is enough for measurement.

While the preferred embodiment of the present invention has been described using specific terms, such description is for illustrative purpose only, and it is to be understood by those skilled in the art that changes and variations for the combination of composition elements and processes may be made without departing from the spirit or scope of the following claims. Such variations will be described as follows.

In the embodiment mentioned above, a viewpoint position correction method in the case where a user stereoscopically views a parallax image displayed on the display 300 was described; the same method is also applicable when a user views a stereoscopic image by wearing a head-mounted display on his or her head. In the case where it is desired for a displayed three-dimensional object to be unmovable even if a user moves his or her head with a head-mounted display worn, the viewpoint position correction method described with the above-mentioned embodiment may be used so as to make a configuration in which a stereoscopic video is outputted in accordance with an updated viewpoint position.

REFERENCE SIGNS LIST

10 . . . Imaging block, 20 . . . Marker detection block, 30 . . . Viewpoint position correction block, 40 . . . Stereoscopic image generation block, 50 . . . Three-dimensional model storage block, 60 . . . Display block, 70 . . . Calibration block, 72 . . . Head-top marker coordinate acquisition block, 74 . . . Left-side head marker coordinate acquisition block, 76 . . . Right-side head marker coordinate acquisition block, 78 . . . Translation computation block, 80 . . . Head tilt computation block, 82 . . . Translation correction amount computation block, 84 . . . Shift amount computation block, 86 . . . Viewpoint position update block, 100 . . . Headband-with-markers, 110 . . . Marker, 200 . . . Game machine, 210 . . . Stereoscopic image generation apparatus, 300 . . . Display, 310 . . . Camera, 400 . . . Stereoscopic vision glasses

INDUSTRIAL APPLICABILITY

The present invention is applicable to technologies configured to generate stereoscopic videos.

The invention claimed is:

1. An image generation apparatus comprising:
a marker detection block configured to scan a taken image of a plurality of markers of a fixture worn on a head of a user so as to detect a two-dimensional coordinate on the taken image of said plurality of markers;
a viewpoint position correction block configured to correct a viewpoint position of the user without use of a coordinate of a Z direction of the markers but by use of said detected two-dimensional coordinate of said plurality of markers; and
a stereoscopic image generation block configured to generate a parallax image obtained when a three-dimensional object is viewed from the corrected viewpoint position,
wherein said plurality of markers include a first marker arranged at a top section of the head of the user and
said viewpoint position correction block includes
a translation correction amount computation block configured to obtain a translation correction amount of a viewpoint position on the basis of a two-dimensional coordinate of the marker at the top section of the head, and
a viewpoint position update block configured to subtract said translation correction amount from a viewpoint position on the basis of said translation correction amount.

2. The image generation apparatus according to claim 1, wherein
said plurality of markers further include a second marker arranged at a left-side head and a third marker arranged at a right-side head;
said viewpoint position correction block further includes
a head tilt computation block configured to obtain a tilt of a head on the basis of a two-dimensional coordinate of the second marker of the left-side head and a two-dimensional coordinate of the third marker of the right-side head,
wherein the first marker, second marker, and third marker are positioned near a rotational center of the head; and
a shift amount computation block configured to obtain a shift amount of the viewpoint position on the basis of the head tilt;
said translation correction amount computation block obtains a translation correction amount of the viewpoint position on the basis of a two-dimensional coordinate of the first marker at the top section of the head and the head tilt; and
said viewpoint position update block updates the viewpoint position on the basis of said shift amount and said translation correction amount.

3. The image generation apparatus according to claim 1, further comprising:
a calibration block configured to prompt the user to adjust the positions of the markers by moving a fixture worn on the head of the user forward and backward by making said stereoscopic image generation block generate a parallax image of a three-dimensional object for calibration so as to make the stereoscopically viewed three-dimensional object for calibration be at a standstill even if the head is moved.

4. The image generation apparatus according to claim 1, wherein the first marker, the second marker, and the third marker are positioned on a headband worn on the head.

5. A calibration method comprising:
scanning a taken image of a plurality of markers of a fixture worn on a head of a user so as to detect a two-dimensional coordinate on the taken image of said plurality of markers;
correcting a viewpoint position of the user without use of a coordinate of a Z direction of the markers but by use of said detected two-dimensional coordinate of said plurality of markers;
generating a parallax image obtained when a three-dimensional object for calibration is viewed from the corrected viewpoint position; and
prompting the user to adjust the positions of the markers by moving the fixture worn on the head of the user forward and backward so as to make the stereoscopically viewed three-dimensional object for calibration be at a standstill even if the head is moved.

6. An image generation method comprising:
scanning a taken image of a plurality of markers of a fixture worn on a head of a user so as to detect a two-dimensional coordinate on the taken image of said plurality of markers;
correcting a viewpoint position of the user without use of a coordinate of a Z direction of the markers but by use of said detected two-dimensional coordinate of said plurality of markers; and
generating a parallax image obtained when a three-dimensional object is viewed from the corrected viewpoint position,
wherein said plurality of markers include at least a marker arranged at a top section of the head of the user and said correcting includes
obtaining a translation correction amount of a viewpoint position on the basis of a two-dimensional coordinate of the marker at the top section of the head, and
updating a viewpoint position by subtraction said translation correction amount from the viewpoint position.

* * * * *